United States Patent
Komiya

(10) Patent No.: US 9,274,284 B2
(45) Date of Patent: Mar. 1, 2016

(54) WAVELENGTH SELECTIVE SWITCH AND METHOD FOR CORRECTING DEVIATION OF WAVELENGTH

(75) Inventor: Shinji Komiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 917 days.

(21) Appl. No.: 13/305,862

(22) Filed: Nov. 29, 2011

(65) Prior Publication Data

US 2012/0170930 A1 Jul. 5, 2012

(30) Foreign Application Priority Data

Jan. 4, 2011 (JP) ................................. 2011-000252

(51) Int. Cl.
*G02B 6/42* (2006.01)
*G02B 6/35* (2006.01)

(52) U.S. Cl.
CPC ............ *G02B 6/3546* (2013.01); *G02B 6/3518* (2013.01)

(58) Field of Classification Search
None
See application file for complete search history.

(56) References Cited

U.S. PATENT DOCUMENTS

| | | | |
|---|---|---|---|
| 7,822,303 B2 * | 10/2010 | Cohen et al. | 385/18 |
| 2006/0198583 A1 * | 9/2006 | Oikawa et al. | 385/53 |
| 2006/0228072 A1 | 10/2006 | Davis et al. | |
| 2008/0239444 A1 * | 10/2008 | Aota et al. | 359/223 |
| 2009/0268272 A1 * | 10/2009 | Wang | H04J 14/0221 359/276 |
| 2010/0150563 A1 | 6/2010 | Nakajima | |

FOREIGN PATENT DOCUMENTS

| | | |
|---|---|---|
| JP | 6-331850 | 12/1994 |
| JP | 2008-536168 | 9/2008 |
| JP | 2009-104081 | 5/2009 |
| JP | 2009104081 A * | 5/2009 |
| JP | 2010-139854 | 6/2010 |
| JP | 2010-277029 | 12/2010 |

OTHER PUBLICATIONS

Japanese Office Action issued May 13, 2014 in corresponding Japanese Patent Application No. 2011-000252.

* cited by examiner

*Primary Examiner* — Tina Wong
(74) *Attorney, Agent, or Firm* — Staas & Halsey LLP

(57) ABSTRACT

A wavelength selective switch includes an input port and an output port, a wavelength demultiplexer that demultiplexes wavelength-multiplexed signal light into wavelengths in different optical paths, an optical-path controller that controls an array that has a plurality of switch elements, the plurality of switch elements switching all or a part of the wavelengths to be coupled from the input port to the output port, and an actuator driver that shifts the plurality of switch elements, based on a deviation of a center wavelength of a pass band from a reference wavelength.

20 Claims, 21 Drawing Sheets

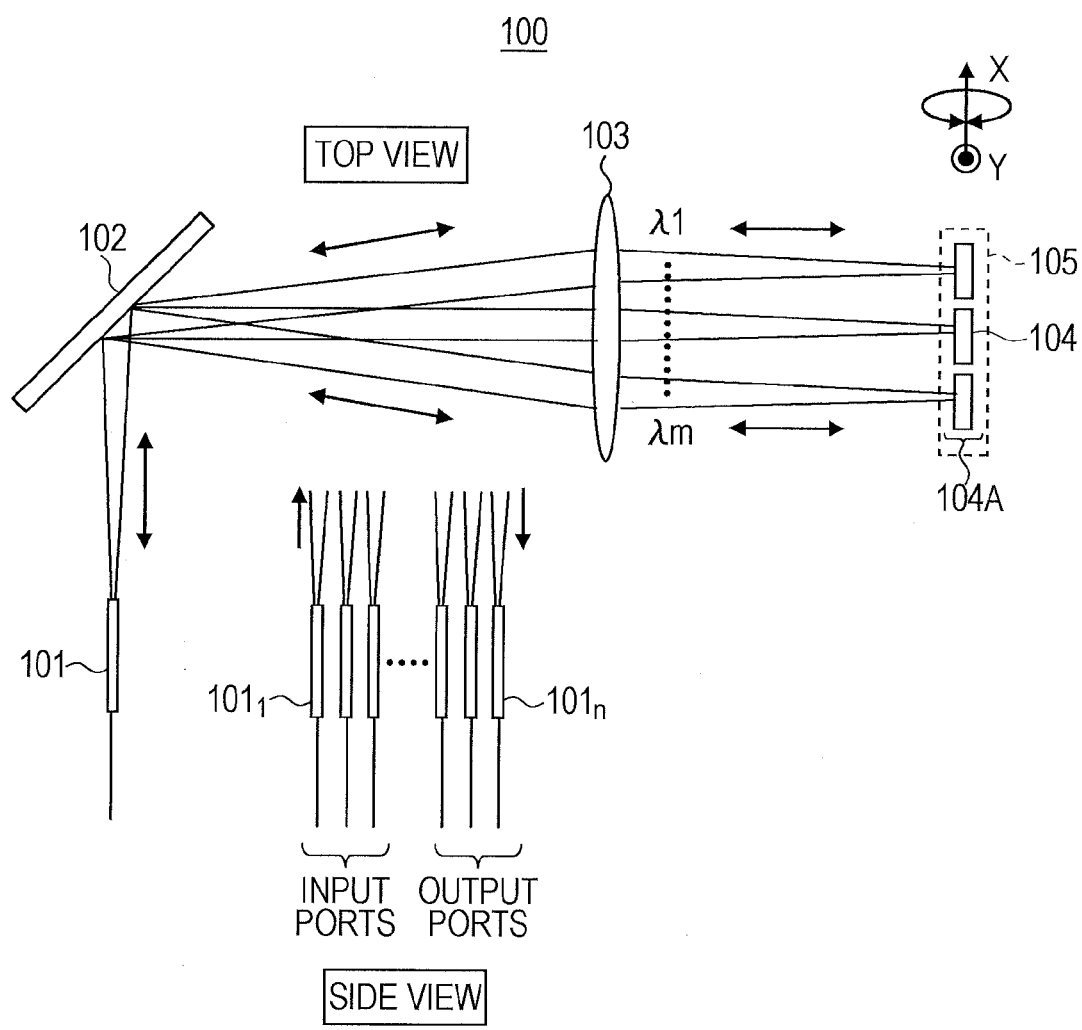

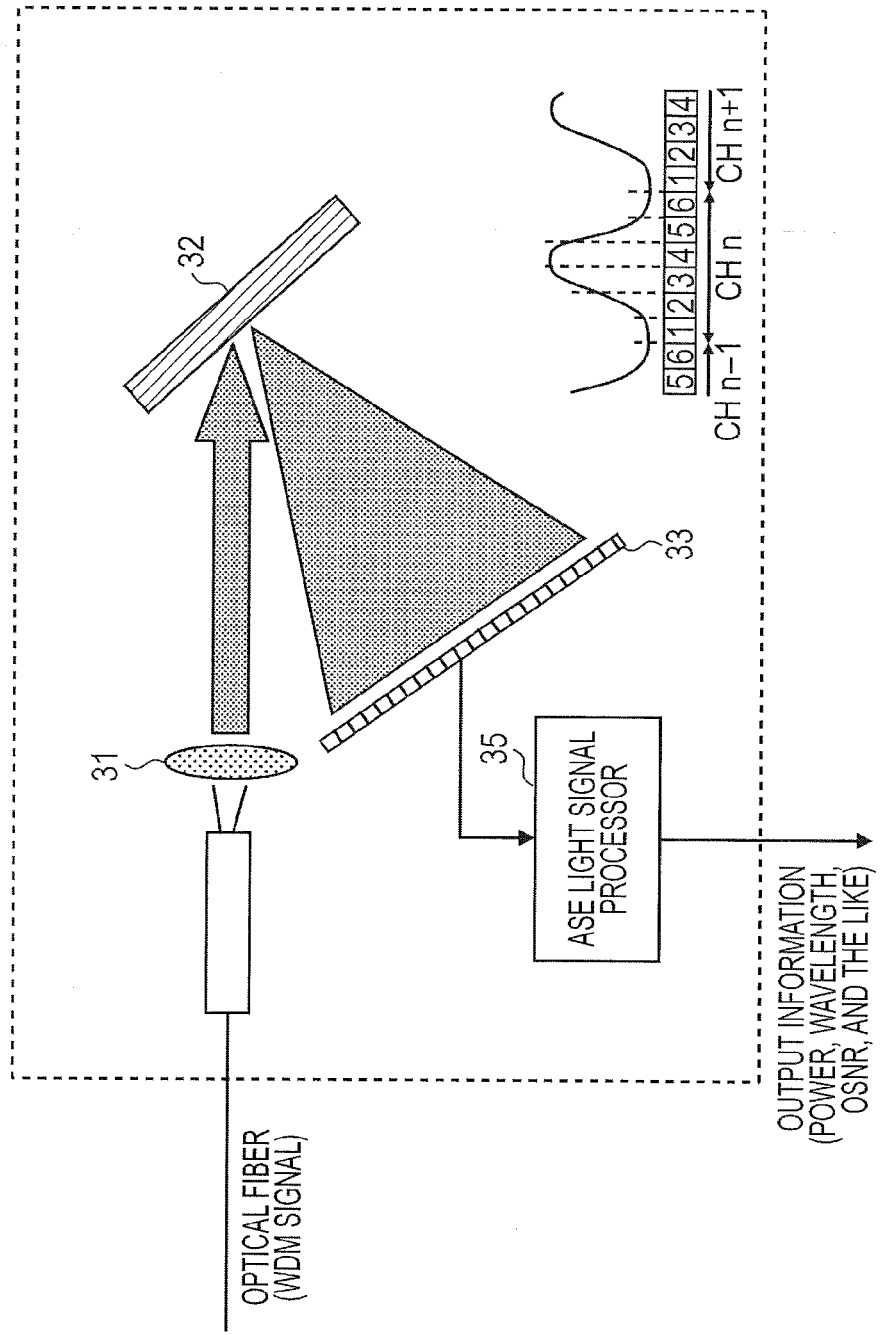

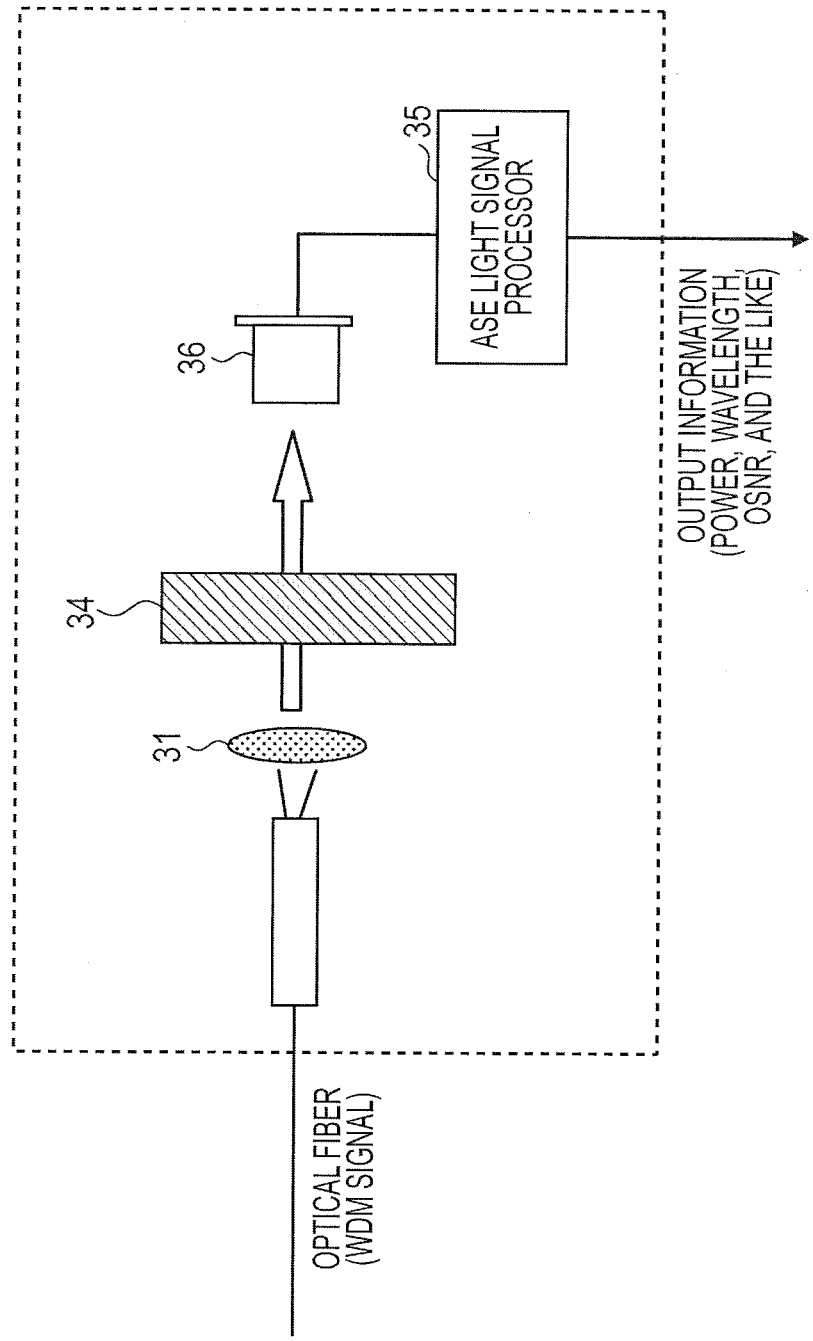

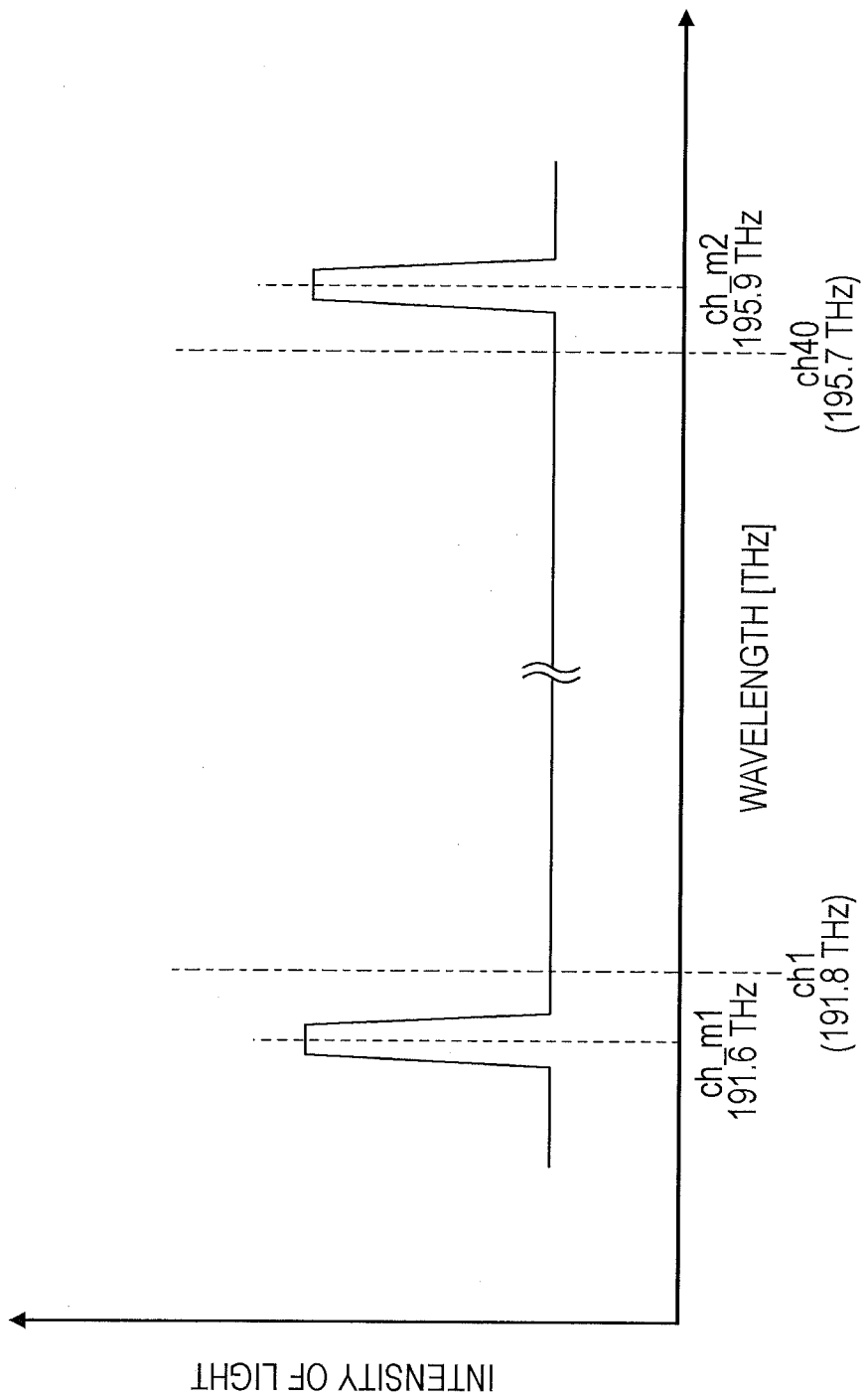

(BEFORE CORRECTION)

(AFTER CORRECTION)

(BEFORE CORRECTION)

(AFTER CORRECTION)

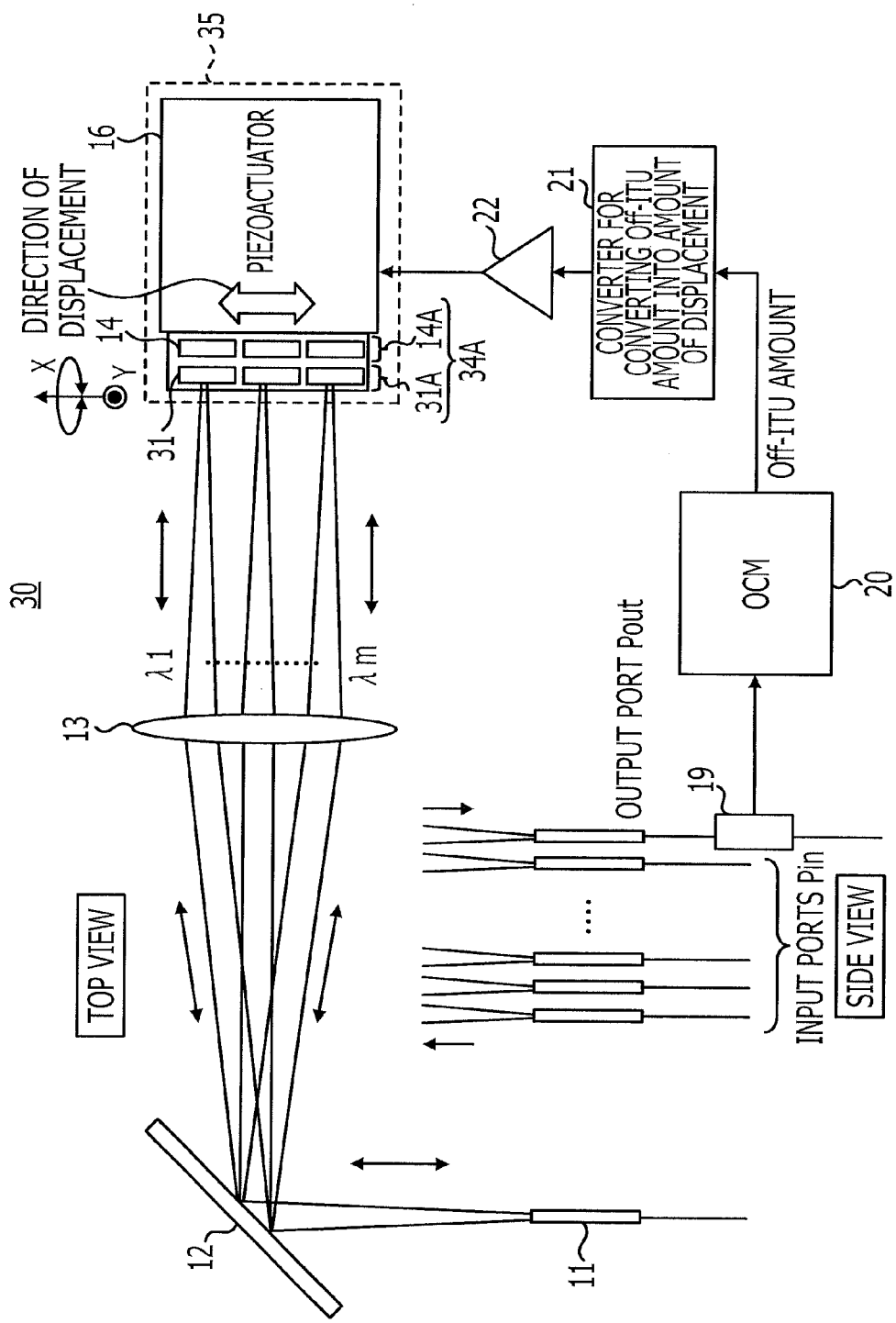

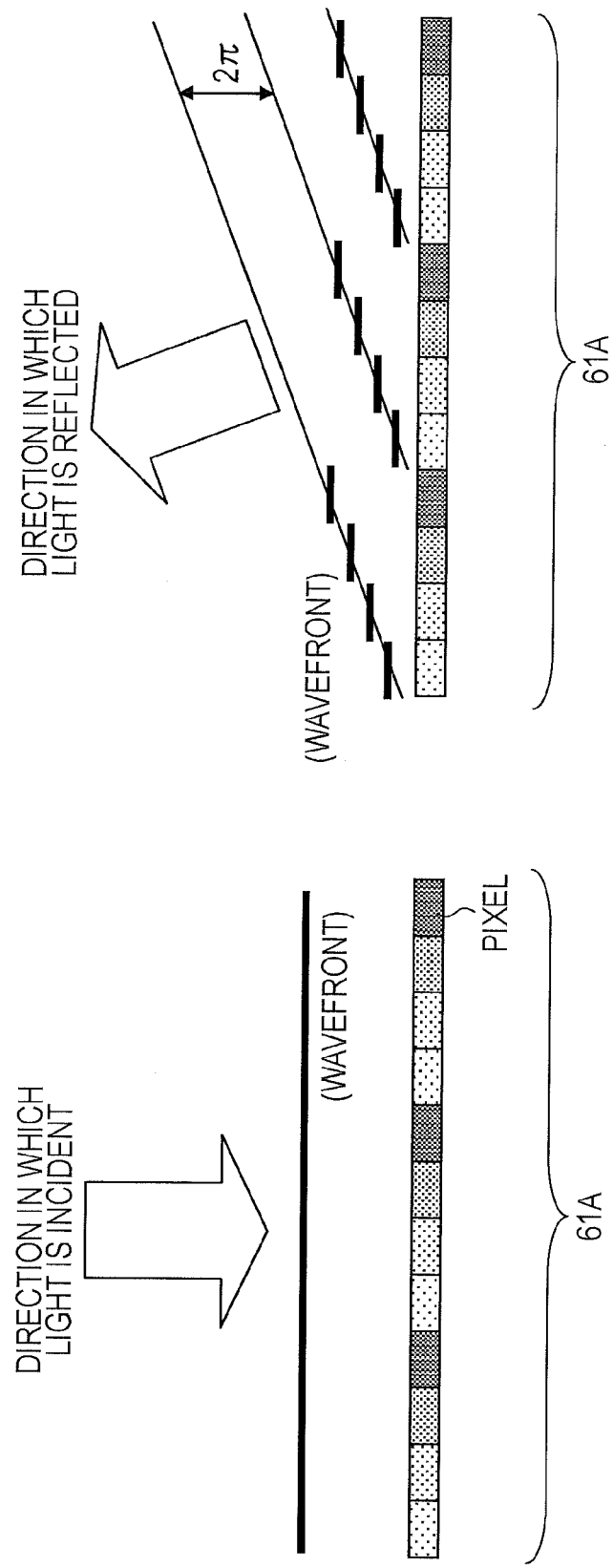

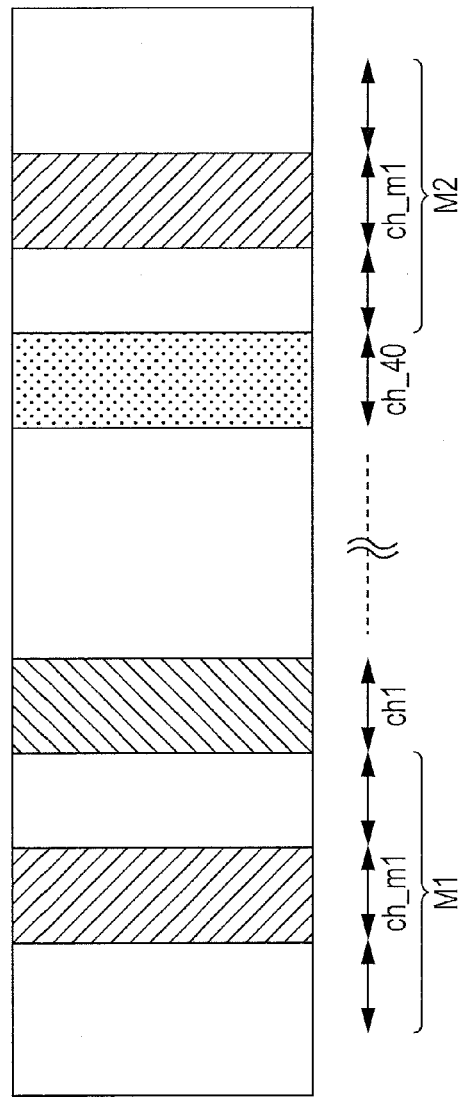 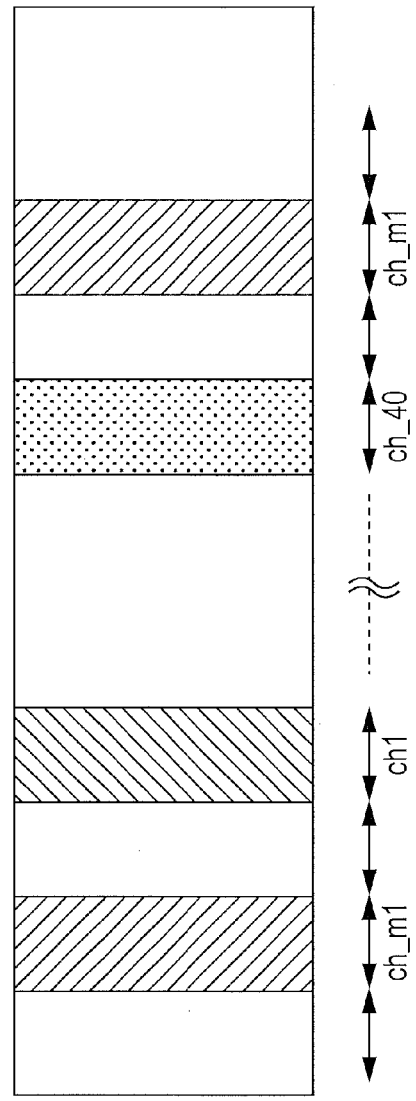

ant output is set for each of the wavelengths by the MEMS mirror array 104A. When the WSS 100 has a

WAVELENGTH SELECTIVE SWITCH AND METHOD FOR CORRECTING DEVIATION OF WAVELENGTH

CROSS-REFERENCE TO RELATED APPLICATION

This application is based upon and claims the benefit of priority of the prior Japanese Patent Applications No. 2011-000252, filed on Jan. 4, 2011, the entire contents of which are incorporated herein by reference.

FIELD

The embodiments disclosed herein relate to a wavelength selective switch that is used for a wavelength division multiplex (WDM) system, and a method for correcting a deviation of a wavelength.

BACKGROUND

For a wavelength division multiplex (hereinafter referred to as WDM) system, a wavelength selective switch that changes a path of light on a wavelength basis is used.

FIG. 1A is a diagram illustrating an example of the configuration of a wavelength selective switch (WSS) 100 that includes micro electro mechanical systems (MEMS) mirrors. As illustrated in a side view of FIG. 1A, multiple input ports and multiple output ports are provided on the input and output side of the wavelength selective switch 100 and arranged in a single row in a direction perpendicular to the paper sheet of FIG. 1A. First optical systems $101_1$ to $101_n$ are provided for the ports, respectively, and each include a lens and the like. WDM signal light (having wavelengths of λ1 to λm) that is incident on the input ports is output from ends of optical fibers, for example. Then, the WDM signal light is collimated by the first optical systems 101 (collimators, for example) (refer to a top view of FIG. 1). The collimated light is demultiplexed into light with a number m of wavelengths by a wavelength demultiplexer 102 such as a diffraction grating. Then, a second optical system 103 (collecting lens, for example) collects the light and causes the light to be incident on a path controller 105 for controlling and changing a path of an optical signal. The path controller 105 includes an MEMS array 104A that has a number m of MEMS mirrors 104, for example.

As illustrated in FIG. 2A, the MEMS mirrors 104 may at least rotate around an X axis so that angels of the MEMS mirrors 104 are changed. Thus, light that has an interested wavelength can be coupled from an arbitrary one of the input ports to an arbitrary one of the output ports by rotating an interested mirror around the X axis at an angle θ. In addition, the light can be coupled from the arbitrary input port to the arbitrary output port at an arbitrary attenuation rate by rotating the interested mirror around the X axis or a Y axis. As illustrated in a graph of FIG. 2B, the attenuation rate of the MEMS mirror 104 may be controlled by adjusting the angle of the MEMS mirror 104. In FIG. 2B, the abscissa of the graph indicates a value (μm) of (F×θ), where F is a focal length of the second optical system 103 and θ is the angle of the MEMS mirror 104. In FIG. 2B, the ordinate of the graph indicates the attenuation rate (dB).

The light is reflected from the path controller 105 and collimated by the second optical system 103. The collimated light is introduced by the wavelength demultiplexer 102 into an arbitrary output port that has been selected based on the rotational angle of the MEMS mirror 104 around the X axis for each of the wavelengths. Then, the light is coupled to an interested optical fiber by the first optical system 101 at an attenuation rate determined based on the rotational angle of the MEMS mirror 104 around the X axis or the Y axis. When the WSS 100 has only a single input port and a single output port, only an attenuation rate is set for each of the wavelengths by the MEMS mirror array 104A. When the WSS 100 has a single input port and a plurality of output ports, the WSS 100 operates as a DROP type WSS that causes light with an arbitrary wavelength to be coupled from the single input port (common port) to any of the output ports. When the WSS 100 has a plurality of input ports and a single output port, the WSS 100 operates as an ADD type WSS that causes light with an arbitrary wavelength to be coupled from any of the input ports to the single output port (common port). The WSS 100 may have a plurality of input ports, a plurality of output ports and a wavelength demultiplexer that is shared.

FIG. 1B illustrates an ADD type WSS that has a number N of input ports and a single output port. Light that is input to the number N of the input ports is collimated by a collimator (first optical system) 101. Then, the light is demultiplexed into light with wavelengths λ1 to λm by a diffraction grating (wavelength demultiplexer) 102. The demultiplexed light is collected by a second optical system 103. After that, the light is incident on an MEMS array 104A. Mirrors 104 of the MEMS array 104A each cause light with an interested wavelength to be coupled from an arbitrarily selected one of the input ports to the output port. In addition, angles of the mirrors are controlled so that the mirrors have arbitrary attenuation rates.

In order to cause a diffraction grating element (to be used to select a wavelength) to offset or reduce shifting (owing to a variation in a temperature) of an angle of diffraction of light with a selected center wavelength, a configuration in which a diffraction grating is relatively rotated when the temperature increases has been proposed.

A related technique is disclosed, for example, in Japanese Laid-open Patent Publication No. H06-331850.

In an optical communication network, a signal that is transmitted may pass through wavelength selective switches (WSSs) of multiple nodes. In order to prevent a waveform of the signal from being degraded, the WSSs preferably each have a transmission band property that enables light having a band that is nearly equal to or wider than a band of the signal (signal light) to pass through the WSS. Especially, when the transmission rate is a high rate of 40 GHz, 100 GHz or the like (which has been used in recent years), spreading (caused by a modulation) of a wavelength spectrum of the signal light is large, the signal light is easily affected by the transmission band properties of the WSSs.

Referring to FIG. 3, in the following description, an entire transmission bandwidth that includes a transmission band of all channels (chs) is called a "pass band"; and a value that is obtained by doubling a narrower one of a long wavelength side band included in the pass band and a short wavelength side band included in the pass band is called a "clear pass band". In this case, a boundary between the long wavelength side band and the short wavelength side band is determined using, as a reference, an ITU grid wavelength that is a wavelength determined by International Telecommunication Union Telecommunication Standardization Sector (ITU-T). In addition, a deviation of the center wavelength of the pass band from the ITU grid wavelength is called an "Off-ITU amount". The "Off-ITU amount" means a "deviation of a wavelength", which is described in this specification and claims. The Off-ITU amount is expressed using a frequency as a reference. When signal light is shifted toward a higher frequency, the Off-ITU amount is expressed using a positive sign. When the signal light is shifted toward a lower frequency, the Off-ITU amount is expressed using a negative sign.

When a signal is transmitted at a high rate, a clear pass band is preferably wide. Specifically, a wide clear pass band is requested, and an absolute value of the Off-ITU amount needs to be small. The WSS is generally achieved by a spatial optical system. Thus, the Off-ITU amount is determined by the accuracy of alignment of elements that form the spatial optical system. Specifically, when light that has a narrow spectrum and a wavelength equal to the ITU grid wavelength is to be incident in the configuration illustrated in FIG. 1A, the entire optical system needs to be aligned so that the light is incident on the center of an MEMS mirror 104, for example. For example, when the entire MEMS array 104A is shifted in a channel (ch) direction or a wavelength direction, Off-ITU amounts occur for all the channels and the clear pass band is narrowed.

However, it is very difficult to mechanically align the entire optical system. In general, after the entire optical system is mechanically adjusted to a certain extent, gas (such as He or Ar) that has a different refraction index is injected while Off-ITU amounts are monitored. A proportion of a component in internal gas or pressure of the gas is changed so that a refraction index is changed, and whereby the Off-ITU amounts are adjusted to smaller amounts. In this manner, the final fine adjustment is performed in the process of adjusting the gas so as to prevent the clear pass band from being narrowed.

In the aforementioned method, however, the adjustment is insufficient, and the Off-ITU amounts remain. Even when the adjustment is performed, the Off-ITU amounts have temperature characteristics in fact as illustrated in FIG. 4, and the clear pass band is narrowed. The cause of the temperature characteristics is not clear. The present inventor has found that when a temperature changes, the Off-ITU amounts vary by a nearly constant positive amount or a nearly constant negative amount regardless of the channels. Specifically, the inventor has found that the Off-ITU amounts vary depending on the temperature and the variations are nearly equal to each other regardless of the channels (dependencies of the Off-ITU amounts on the channels are low). Thus, it is considered that one of causes of the variations in the Off-ITU amounts is an alignment shifted owing to a mechanical deformation (or distortion) caused by a change in the temperature. The variations (in the Off-ITU amounts) that do not depend on the channels and are nearly equal to each other are merely called "Off-ITU variations".

SUMMARY

According to an aspect of the embodiments, a wavelength selective switch includes an input port and an output port, a wavelength demultiplexer that demultiplexes wavelength-multiplexed signal light into wavelengths in different optical paths, an optical-path controller that controls an array that has a plurality of switch elements, the plurality of switch elements switching all or a part of the wavelengths to be coupled from the input port to the output port, and an actuator driver that shifts the plurality of switch elements, based on a deviation between a center wavelength of a pass band and a reference wavelength.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A illustrates the configuration of a related wavelength selective switch (WSS).

FIG. 9 illustrates a first example of the configuration of an optical channel monitor that is used in the first embodiment.

FIG. 10 illustrates a second example of the configuration of the optical channel monitor that is used in the first embodiment.

FIG. 11 illustrates a spectrum that includes monitor wavelengths of light that is input to an OCM in order to monitor Off-ITU amounts.

FIG. 14A illustrates a configuration in which a path controller is combined with an MEMS array and liquid crystal elements as a modified example of the first embodiment.

FIGS. 18A and 18B illustrate operations for path control that is performed by an LCoS element.

FIGS. 19A and 19B illustrate a method for correcting an Off-ITU amount when the LCoS element is used.

DESCRIPTION OF EMBODIMENTS

Embodiments are described with reference to the accompanying drawings. In the embodiments, a mechanism for monitoring an Off-ITU amount and a mechanical or electrical correction mechanism are added to a wavelength selective switch (WSS). The mechanical or electrical correction mechanism shifts an entire switching path of the WSS based on the monitoring result.

In the embodiments, a monitor wavelength that is different from wavelengths to be multiplexed into a wavelength division multiplexed (WDM) signal is used. The monitor wavelength is obtained from at least one of the side of a short wavelength of the WDM signal and the side of a long wavelength of the WDM signal, and a part of amplified spontaneously emitted (ASE) light is used as the monitor wavelength, as described later. The monitoring mechanism detects the center of the monitor wavelength and calculates, as an Off-ITU amount, a deviation of the center of the monitor wavelength from an ITU grid wavelength. The correction mechanism shifts an entire path (switching path) of the WDM signal so that the Off-ITU amount is corrected and reduced. This operation eliminates a variation in the Off-ITU amount (not depending on a channel) and prevents a reduction in a clear path band.

Figure 6:
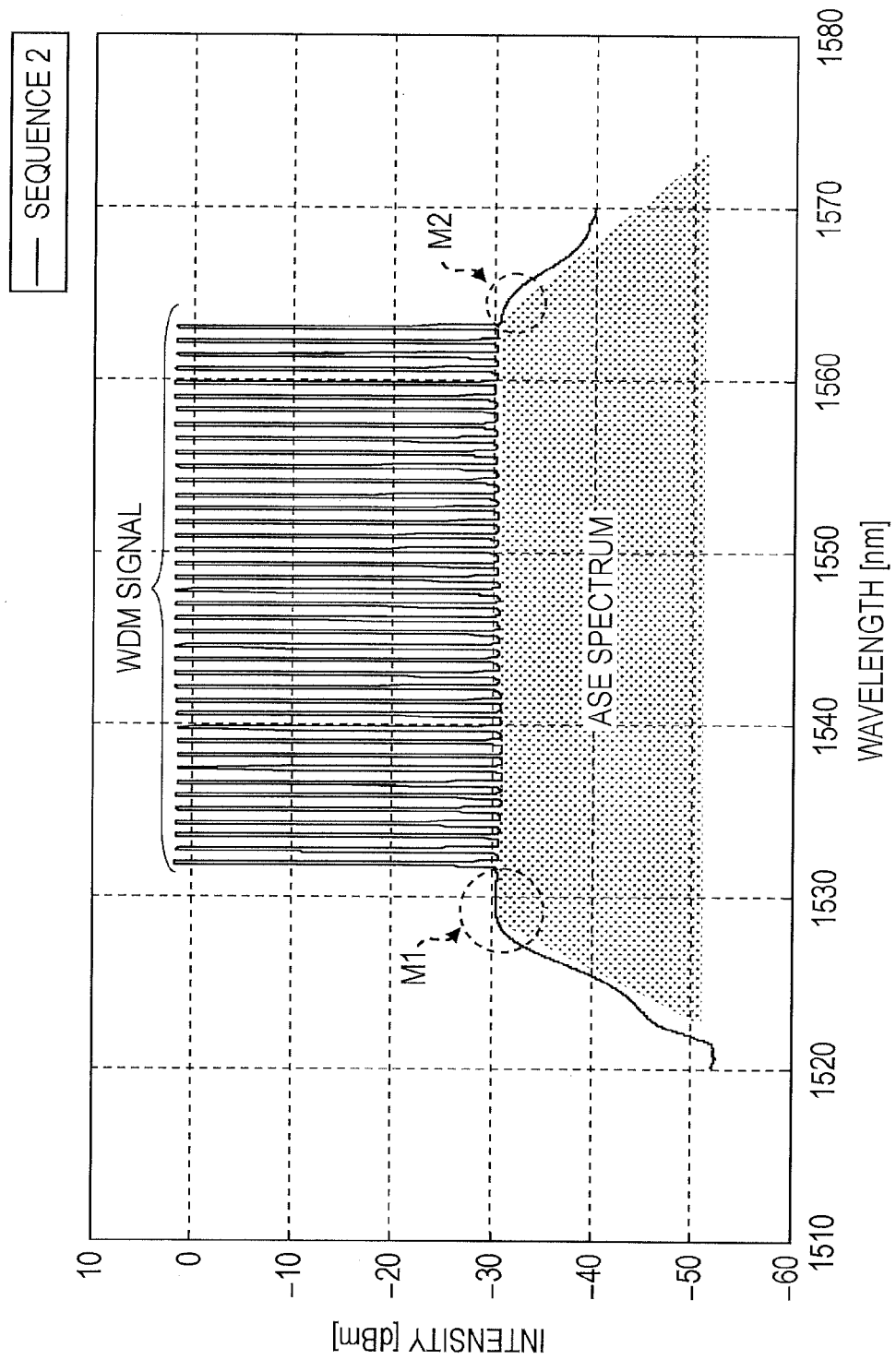
FIG. 6 illustrates a spectrum of ASE light.

FIG. 6 is a diagram illustrating a spectrum of amplified spontaneously emitted (ASE) light included in an optical signal that propagates in the WSS. The optical signal that propagates in the WSS includes a component of ASE light and WDM signal components multiplexed in a certain path band. The WDM signal components have wavelengths (40 wavelengths, for example). The ASE light is generated by an optical amplifier that is located on the upstream side of the WSS. The ASE light has a spectrum that spreads on the sides of short and long wavelengths that are not in a range of a service band, as illustrated in FIG. 6. In the embodiments, at least one of a spectral region on the side of the short wavelengths that are not in the range of the service band and a spectral region on the side of the long wavelengths that are not in the range of the service band is used as a monitor wavelength extraction region. For convenience, the spectral region (ASE spectral region) on the side of the short wavelengths is regarded as a monitor wavelength extraction region M1, while the spectral region (ASE spectral region) on the side of the long wavelengths is regarded as a monitor wavelength extraction region M2.

The wavelength selective switch (WSS) is generally combined with an optical channel monitor (OCM) and used. The OCM has a function of measuring the power and center of each of wavelengths (channels) of signal light that is included in a WDM optical signal input to the OCM. When the WSS is an ADD type WSS, a light that is output from a common port (output port) is branched into parts, and a part of the light is input to the OCM. The OCM measures the power of the signal light for each of the wavelengths, feeds the measured power back to an attenuation function of the WSS, and controls angles of MEMS mirrors. Thus, the optical power is substantially maintained constant. The OCM measures a center wavelength of each of the channels and monitors whether or not the wavelength of each of the channels of the WDM optical signal is separated from the ITU grid wavelength.

In the embodiments, the OCM measures each of the wavelengths of the WDM signal as described above, measures a monitor wavelength, and calculates a deviation of the center of the monitor wavelength from a reference wavelength (ITU grid wavelength). The WSS performs a correction by shifting an entire switching path of the WDM signal based on the calculated deviation.

Figure 5:
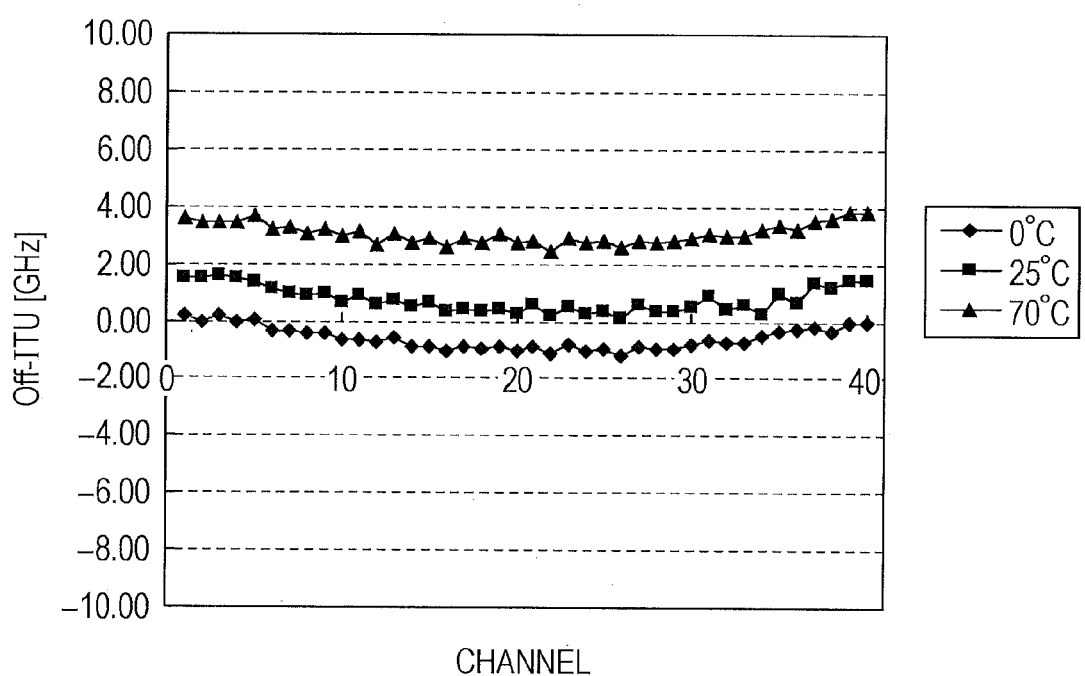
FIG. 5 illustrates an example of dependencies of Off-ITU amounts on a temperature and dependencies of the Off-ITU amounts on channels.

As described in conjunction with FIG. 5, a dependency of a variation (owing to a temperature) in an Off-ITU amount on a channel is small. Thus, Off-ITU amounts of all the channels may be calculated by observing one or two monitor wavelengths that are used as references. At least one of the monitor wavelengths is observed using at least one of the monitor wavelength extraction regions M1 and M2 that are not in the range of the service band so that the Off-ITU amounts are calculated. The switching path is shifted so that the calculated Off-ITU amounts are canceled (compensated). This may optimize a path band.

In order to shift the switching path of the optical signal, an entire MEMS array that includes the MEMS mirrors (functioning as switch elements) is shifted; an angle of a reflection mirror that leads light to the MEMS array is controlled; or all LCoS elements (pixels) to which voltages are to be applied are shifted. The embodiments are described below in detail.

Figure 7:
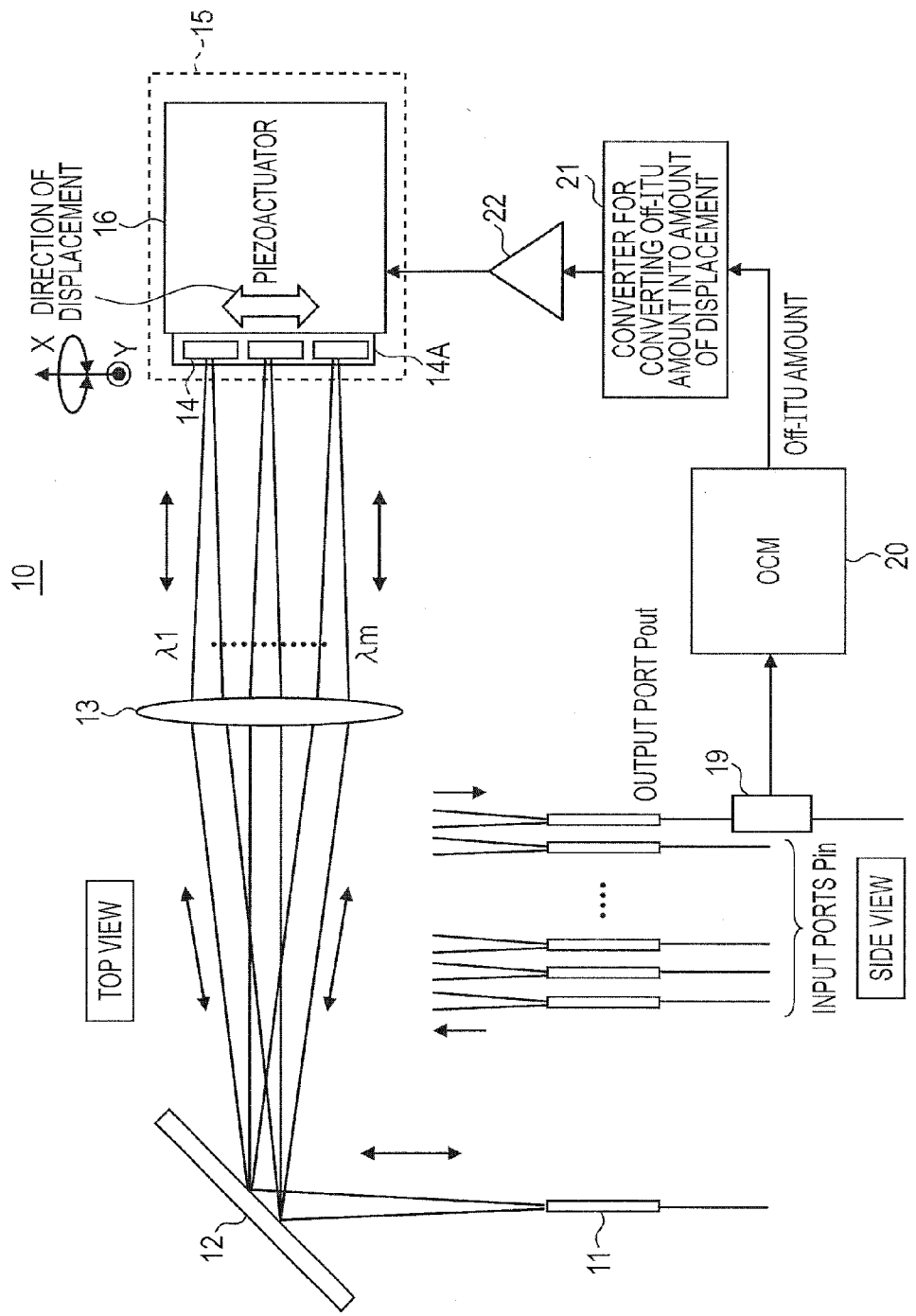
FIG. 7 illustrates an outline configuration of a wavelength selective switch according to a first embodiment.

FIG. 7 is a diagram illustrating an outline configuration of a wavelength selective switch 10 according to a first embodiment. In the first embodiment, path shifting that is performed by a path controller 15 of the wavelength selective switch 10 is achieved by causing a piezoactuator to move an MEMS array.

In an example illustrated in FIG. 7, the wavelength selective switch 10 is an ADD type WSS that has a number N of input ports and a single output port, while the input and output ports are provided for a WDM signal of a 100-GHz grid. Light is incident on the input ports Pin and output from ends of optical fibers. Then, the first optical system 11 collimates the light and causes the collimated light to be incident on a wavelength demultiplexer 12 such as a diffraction grating. Then, the wavelength demultiplexer 12 demultiplexes the light into light that has a number m of wavelengths (40 wavelengths, for example). Then, a second optical system 13 collects the light and causes the light to be incident on the path controller 15. The path controller 15 has an MEMS array 14A and an actuator driver 16. The MEMS array 14A has a plurality of MEMS mirrors 14 that function as the switch elements. The actuator driver 16 moves the entire MEMS array 14A and thereby changes the position of the MEMS array 14A. For convenience of illustration, only three MEMS mirrors 14 are illustrated in FIG. 7. In the first embodiment, a number (m+6) of MEMS mirrors 14 are arranged in the MEMS array 14A. Specifically, in the first embodiment, the MEMS mirrors 14 are provided for the number m of the wavelengths, three channels located on one of both sides of the MEMS array 14A, and three channels located on the other of both sides of the MEMS array 14A, as described later. The actuator driver 16 is a piezoactuator 16 in this example. The piezoactuator 16 controls the position of the entire MEMS array 14A so as to optimally control a path band.

Figure 8:
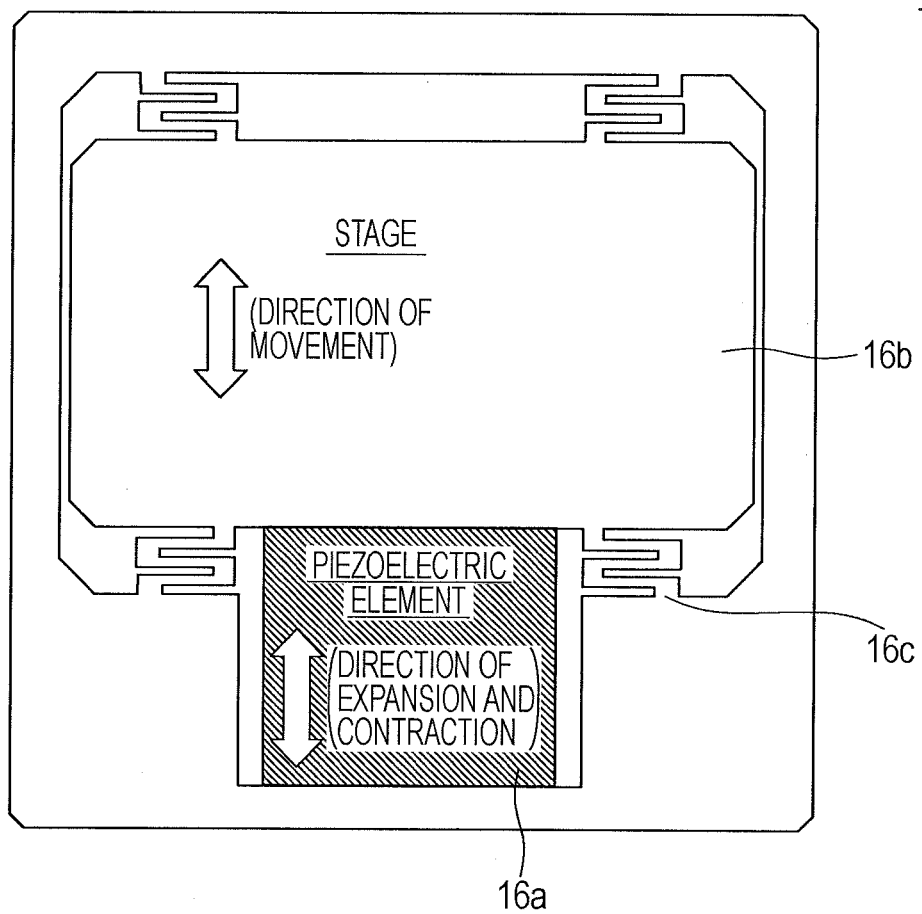
FIG. 8 illustrates an example of the configuration of displacing means that is used in the first embodiment.

FIG. 8 illustrates an example of the configuration of the piezoactuator 16. The piezoactuator 16 includes a piezoelectric element 16a, a stage 16b and a parallel spring 16c. The MEMS array 14A is placed on the stage 16b. The piezoelectric element 16a expands or contracts in a direction (thickness direction) indicated by an arrow illustrated in FIG. 8 when a voltage is applied to the piezoelectric element 16a. Displacement of the piezoelectric element 16a in the thickness direction is converted into displacement in a plane by the parallel spring 16c. Then, the converted displacement is transferred to the stage 16b. As a result, the stage 16b and the MEMS array 14A placed on the stage 16b are moved in a direction indicated by another arrow illustrated in FIG. 8. The direction (indicated by the arrow) in which the stage 16b is moved is a channel direction of the WDM light signal or a wavelength direction. The stage 16b may be displaced at a rate of, for example, 1 μm/volt by applying a voltage to the piezoelectric element 16a.

Figure 1B:
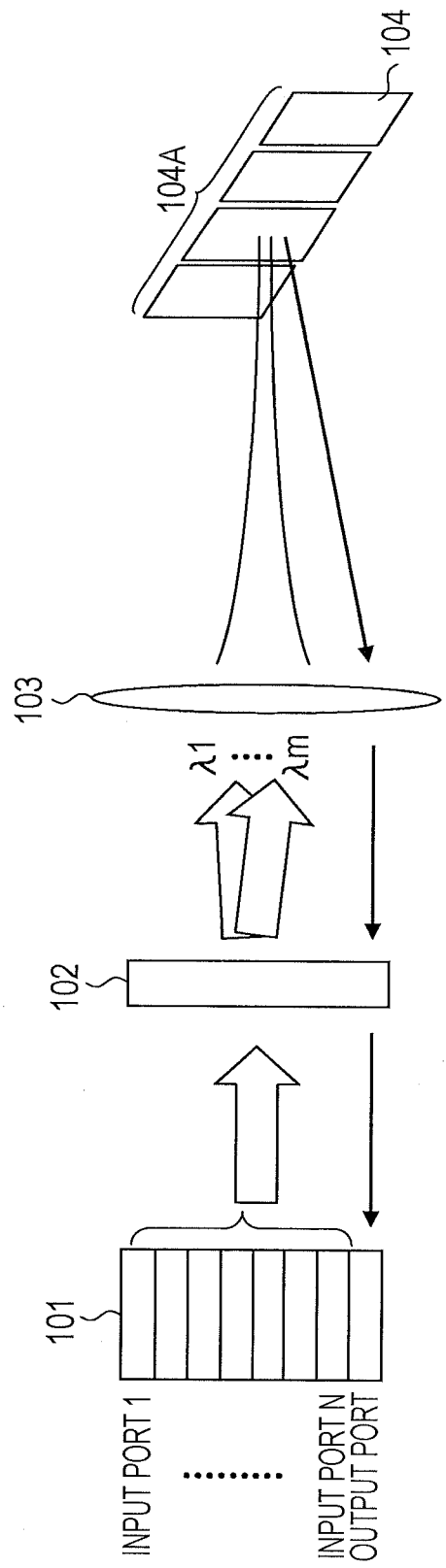
FIG. 1B illustrates an outline configuration of a general ADD type WSS.
Figure 2A:
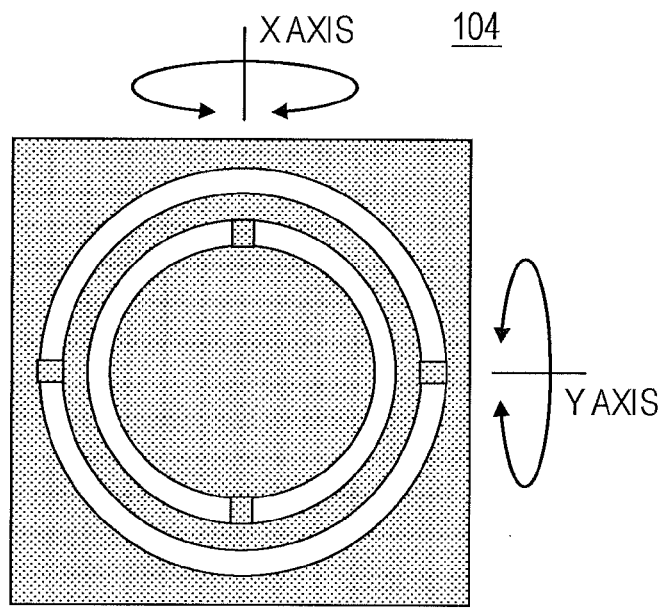
FIG. 2A illustrates an example of the shape of an MEMS mirror.
Figure 2B:
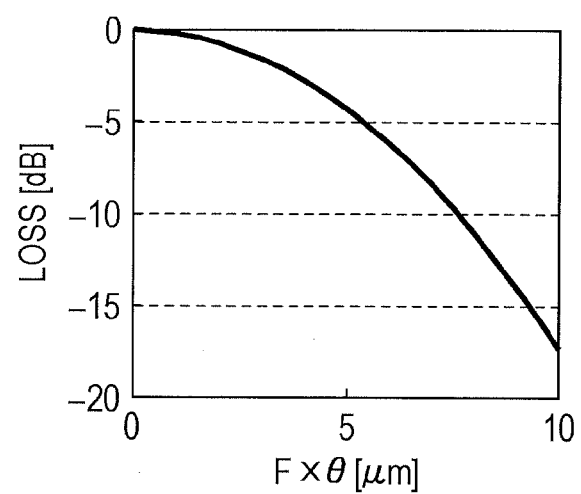
FIG. 2B illustrates a dependency of an attenuation rate of an MEMS mirror on an angle of the MEMS mirror.
Figure 3:
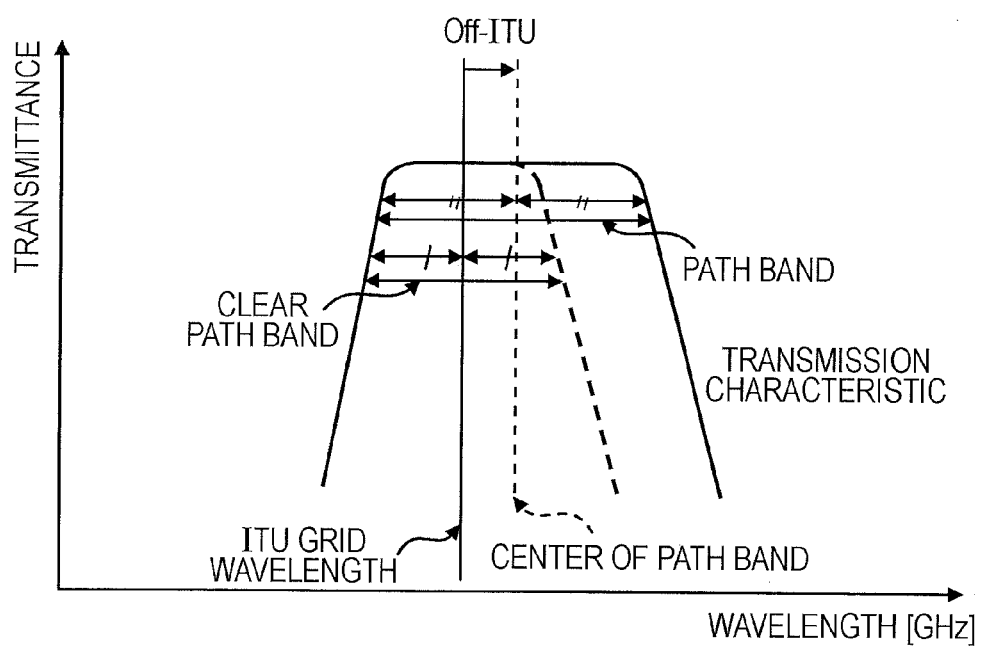
FIG. 3 illustrates definitions of terms that are a path band, a clear path band and an Off-ITU amount and used in this application and claims.
Figure 4:
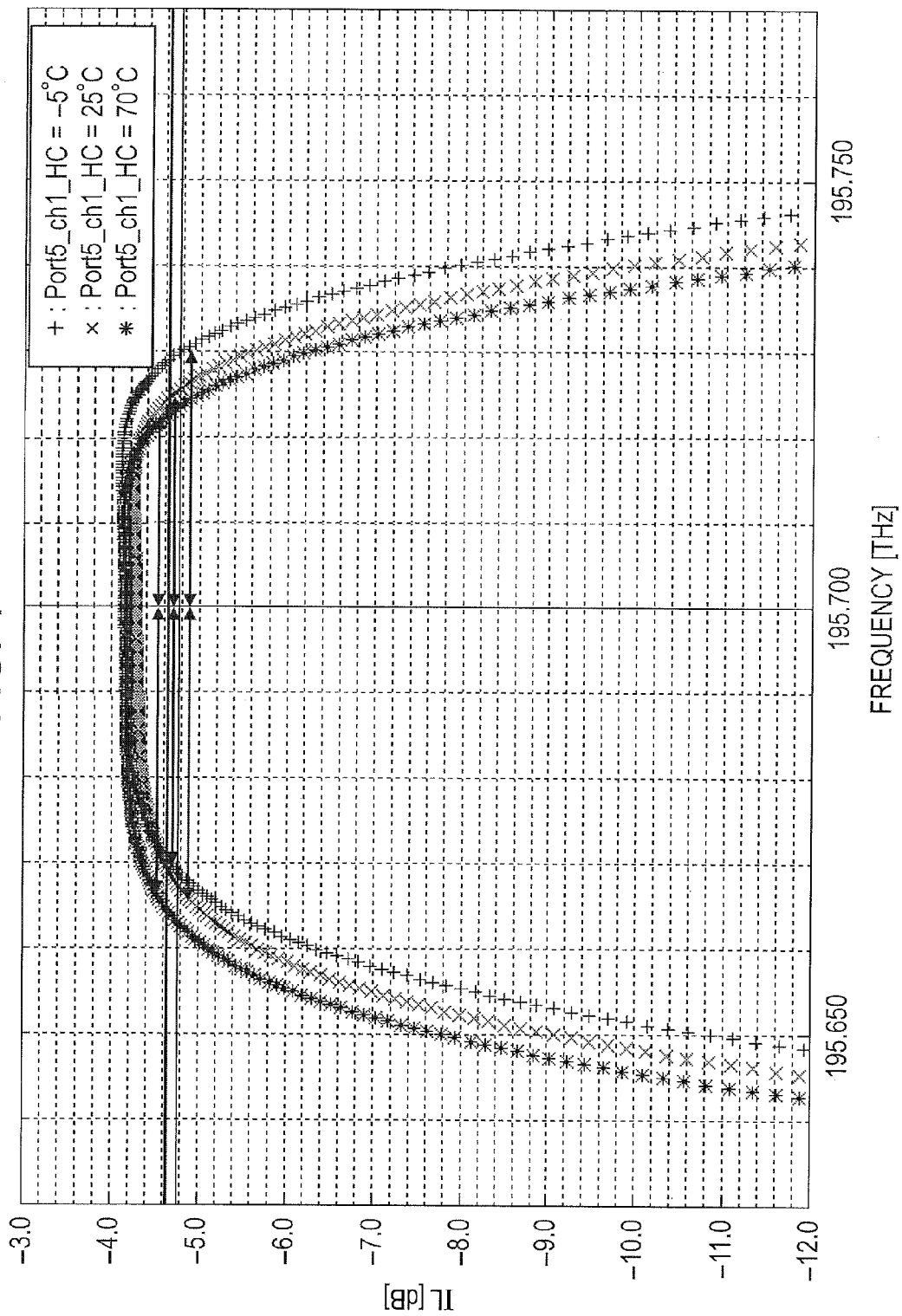
FIG. 4 illustrates an example of temperature characteristics of OFF-ITU amounts.

Returning to FIG. 7, the light that is output from the path controller 15 is collimated by the second optical system 13. Then, the wavelength demultiplexer 12 causes the light to be coupled to the output port (common port) Pout. Rotational angles of the MEMS mirrors 14 around an X axis are controlled so that light that has a desired wavelength is coupled from a desired input port to the output port Pout (refer to FIG. 2A). In this case, the MEMS mirrors 14 slightly rotate around the X axis or a Y axis so that the light is coupled from the desired input port to the output port Pout at an arbitrary attenuation rate.

In the output port Pout, the WDM signal light is branched into parts by a coupler 19. Then, a part of the WDM signal is input to an optical channel monitor (OCM) 20. The OCM 20 measures an Off-ITU amount (deviation of the center of a wavelength of the WDM signal input to the OCM 20 from the ITU grid wavelength in the wavelength direction). The measured Off-ITU amount is converted into the amount of displacement by a converter 21. The converted amount is amplified by an amplifier 22. The amplified amount is applied, as a voltage, to the piezoelectric element 16a of the path controller 15. The conversion of the Off-ITU amount into the amount of displacement is described later.

FIG. 9 is an outline diagram illustrating a first example of the configuration of the OCM 20. In an OCM 20A, the part that is included in the WDM signal and obtained by the branching performed by the coupler 19 in the output port Pout is collimated by a lens 31. Then, the part of the WDM signal is dispersed by a diffraction grating 32 and received by a photodiode (PD) array 33. The PD array 33 includes 256 elements, for example. An ASE light signal processor 35 measures power of each of the channels and a center wavelength of each of the channels. Specifically, the ASE light signal processor 35 assigns a plurality of elements (6 elements, for example) to a single wavelength (channel), observes a spectrum of the wavelength, and measures a peak intensity and center wavelength of the spectrum. In addition, the ASE light signal processor 35 separates noise light from the WDM signal and measures an optical signal-to-noise ratio (OSNR).

FIG. 10 is an outline diagram illustrating a second example of the configuration of the OCM 20. In an OCM 20B, monitor signal light is collimated by the lens 31 and dispersed by a tunable filter 34 so that the signal light has a wavelength in a narrow band. Then, the monitor signal light is received by a single photodiode (PD) 36. Since the tunable filter 34 sweeps the entire band of the WDM monitor signal, the ASE light signal processor 35 may monitor the power and center wavelength of each of the channels. Similarly to the example illustrated in FIG. 9, information that is output from the OCM 20B includes the power of each of the channels, the center wavelength of each of the channels, and the OSNR of each of the channels.

FIG. 11 is a diagram illustrating a spectrum of WDM monitor wavelengths. The case in which service wavelengths are in a range from 191.8 THz (for a channel 1 (ch1)) to 195.7 THz (for a channel 40 (ch40)) and used for 40 channels is descried as an example. It is assumed that an ITU grid (interval) is 100 GHz as described above.

In this example, "monitor wavelengths" are set to 191.6 THz and 195.9 THz that are separated by 200 GHz from the service band. The monitor wavelength of 191.6 THz is a short wavelength that is not in the service band, while the monitor wavelength of 195.9 THz is a long wavelength that is not in the service band. The monitor wavelength of 191.6 THz is expressed as "ch_m1", while the monitor wavelength of 195.9 THz is expressed as "ch_m2". The MEMS array 14A of the WSS 10 has the MEMS mirrors 14 that support a range of wavelengths of 191.5 THz to 196.0 THz and are provided for 46 channels. Specifically, the 46 channels are the 40 channels for the service wavelengths (of 191.8 THz to 195.7 THz) and 3×2 channels to be used to extract monitor light from both sides of the service band.

MEMS mirrors 14 that are included in the MEMS array 14A and correspond to the monitor wavelengths ch_m1 (191.6 THz) and ch_m2 (195.9 THz) are set to be fully open (and minimize losses). On the other hand, MEMS mirrors 14 that are included in the MEMS array 14A and correspond to wavelengths of 191.5 THz, 191.7 THz, 195.8 THz and 196.0 THz are set to be fully closed (and maximize losses). The wavelength of 191.5 THz is smaller by the ITU grid of 100 GHz than the monitor wavelength of 191.6 THz, while the wavelength of 191.7 THz is larger by the ITU grid of 100 GHz than the monitor wavelength of 191.6 THz. The wavelength of 195.8 THz is smaller by the ITU grid of 100 GHz than the monitor wavelength of 195.9 THz, while the wavelength of 196.0 THz is larger by the ITU grid of 100 GHz than the monitor wavelength of 195.9 THz. The losses may be set by controlling voltages to be applied to the MEMS mirrors 14, changing the angles of the MEMS mirrors 14, and controlling the attenuation rates.

The ASE light fundamentally has a broadband spectrum that includes the monitor wavelength extraction regions M1 and M2 as illustrated in FIG. 6. Only light components with the monitor wavelengths that are targets may be extracted by causing the MEMS mirrors 14 to attenuate light components with wavelengths that are smaller and larger by the ITU grid than the monitor wavelengths and to maximize losses of the light components with the wavelengths that are smaller and larger by the ITU grid than the monitor wavelengths, as illustrated in FIG. 11. The light components that have the monitor wavelengths and are extracted in the aforementioned manner are output from the common port (output port) Pout of the WSS. Then, the coupler 19 causes the light components with the monitor wavelengths to be input to the OCM 20. The OCM 20 can accurately measure the centers of the monitor wavelengths of the extracted light components. Differences between the measured centers of the monitor wavelengths and the ITU grid wavelength (reference wavelength) are Off-ITU amounts of the monitor wavelengths.

Figure 12A:
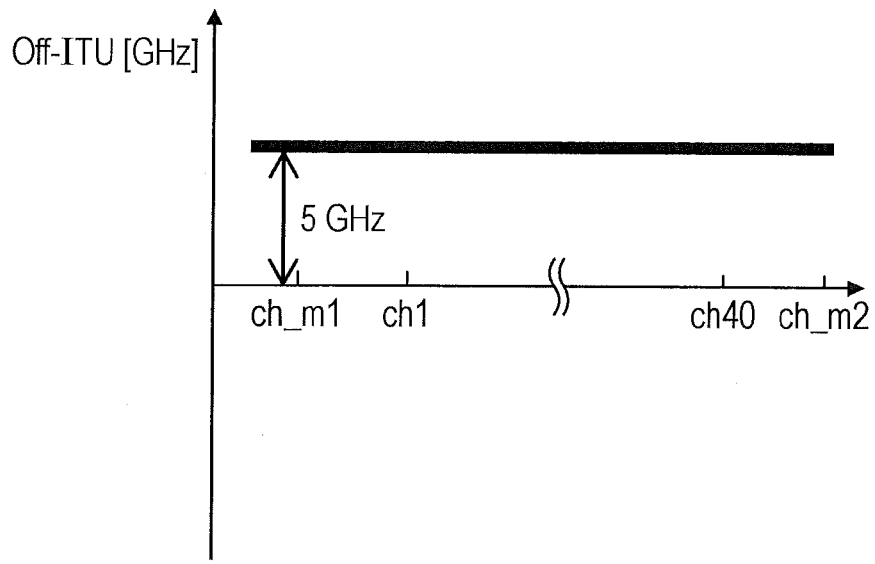
FIGS. 12A and 12B illustrate a first example of a correction of Off-ITU amounts.

As described in conjunction with FIG. 5, the Off-ITU amounts are affected by a variation in a temperature and vary by a constant positive amount or a constant negative amount regardless of the channels. Thus, the Off-ITU amounts of the monitor wavelengths and the variations in the Off-ITU amounts can be applied to all the channels in the service band. For example, it is assumed that Off-ITU amounts that are calculated from all the channels are previously zero, and then positively evenly vary owing to a deformation (owing to a temperature) of a member or the like, as illustrated in FIG. 12A. Based on this assumption, the entire MEMS array 14A is displaced by a negative amount so that the Off-ITU amount of the monitor wavelength ch_m1 is eliminated.

The converter 21 of the WSS 10 calculates the amount A of the displacement based on the Off-ITU amount output from the OCM 20. When the ITU grid (interval) is 100 GHz, and the intervals (corresponding to grids) of the MEMS mirrors 14 are d, the amount A of the displacement is expressed by Equation (1).

$$\Delta = (\text{Off-ITU amount(GHz)}/100(\text{GHz})) \times d(\mu m) \quad (1)$$

When the intervals of the MEMS mirrors 14 that are included in the WSS 10 are 250 μm, the amount Δ of the displacement is expressed by Equation (2).

$$\Delta = (\text{Off-ITU amount(GHz)}/100(\text{GHz})) \times 250(\mu m) \quad (2)$$

Figure 12B:
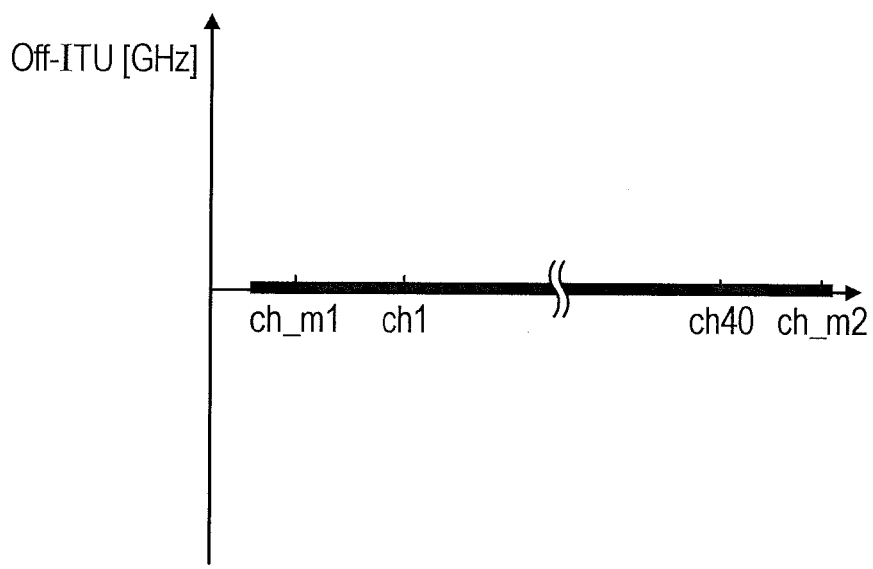

FIGS. 12A and 12B illustrate a first example of a correction of Off-ITU amounts. As illustrated in FIG. 12A, it is assumed that the Off-ITU amount that is calculated from the monitor wavelength ch_m1 is 5 GHz. In addition, it is assumed that Off-ITU amounts that are calculated from all the channels are nearly equal to each other. Based on this assumption, the amount of the displacement is 12.5 µm=(5×100)×250 µm. The MEMS array 14A is negatively shifted by 12.5 µm by the piezoactuator 16 in the channel direction. As a result, as illustrated in FIG. 12B, the Off-ITU variations that do not depend on the channels are eliminated.

When the Off-ITU variations are equal to or nearly equal to each other as described in the example illustrated in FIGS. 12A and 12B, the Off-ITU amounts may be minimized by monitoring only one of the monitor wavelengths ch_m1 and ch_m2. Thus, the path correction according to the present embodiment may be achieved even in a configuration in which MEMS mirrors that correspond to an ASE spectral region on at least one of both sides of the service band and are provided for three channels are added. When Off-ITU amounts unevenly vary as illustrated in FIG. 13, the variations in the Off-ITU amounts slightly depend on the channels in some cases. Thus, it is preferable that both wavelengths ch_m1 and ch_m2 be monitored.

Figure 13A:
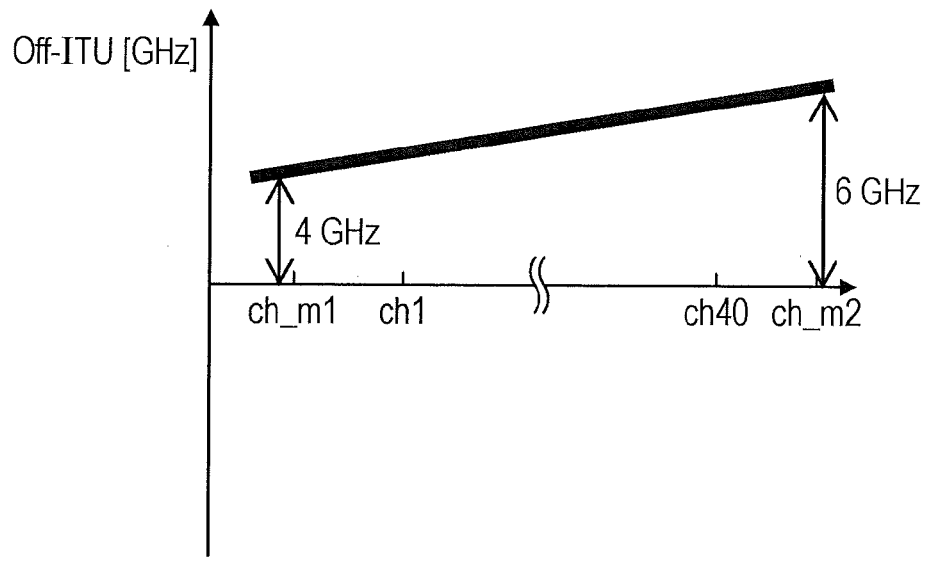
FIGS. 13A and 13B illustrate a second example of the correction of Off-ITU amounts.
Figure 13B:
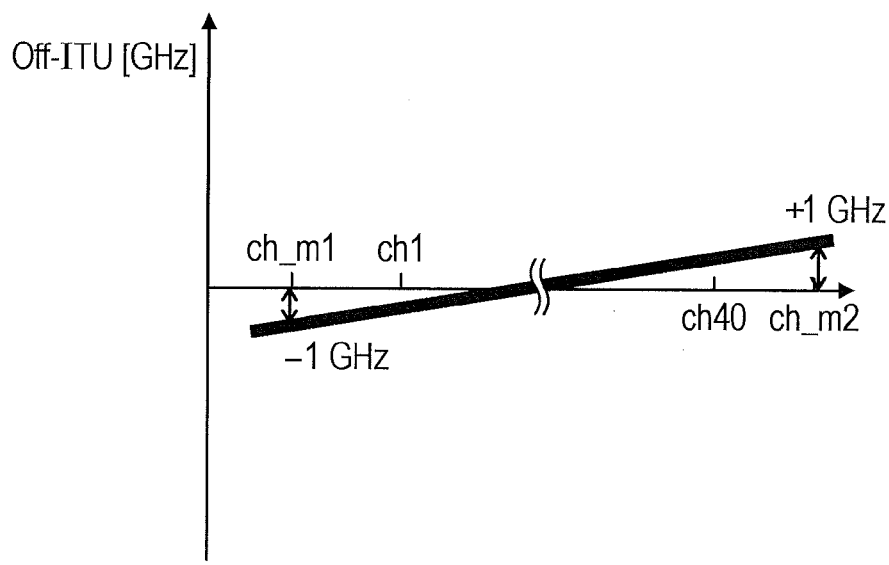

FIGS. 13A and 13B are diagrams illustrating a second example of the correction of Off-ITU amounts. When the original Off-ITU amounts depend on the channels as illustrated in FIG. 13A, and only the Off-ITU amount of the wavelength ch_m1 is to be eliminated, Off-ITU amounts that correspond to channels of large numbers are not eliminated and remain. On the other hand, when only the Off-ITU amount of the wavelength ch_m2 is to be eliminated, Off-ITU amounts that correspond to channels of small numbers are not eliminated and remain.

In this case, the MEMS array 14A is shifted by an amount corresponding to a half of the sum of the Off-ITU amounts of the wavelengths ch_m1 and ch_m2, or by an amount that causes the average Off-ITU to be eliminated. When the Off-ITU amount of the wavelength ch_ml is 4 GHz and the Off-ITU amount of the wavelength ch_m2 is 6 GHz as illustrated in FIG. 13B, the MEMS array 14A is shifted by an amount that corresponds to a deviation of 5 GHz. In this case, the amount of the displacement is 12.5 µm=(5/100)×250 µm as expressed by Equation (2).

In this method, as channels are closer to the channels located at both ends, Off-ITU amounts are not completely eliminated. However, the Off-ITU amounts are optimized from the perspective of all the channels ch1 to ch40. When the Off-ITU amounts that are nearly equal to each other are calculated from all the channels as illustrated in FIGS. 12A and 12B, and the MEMS array is shifted using the average of the Off-ITU amounts calculated from the wavelengths ch_m1 and ch_m2, the Off-ITU amounts are eliminated without any problem, and the path band is optimized.

Figure 14B:
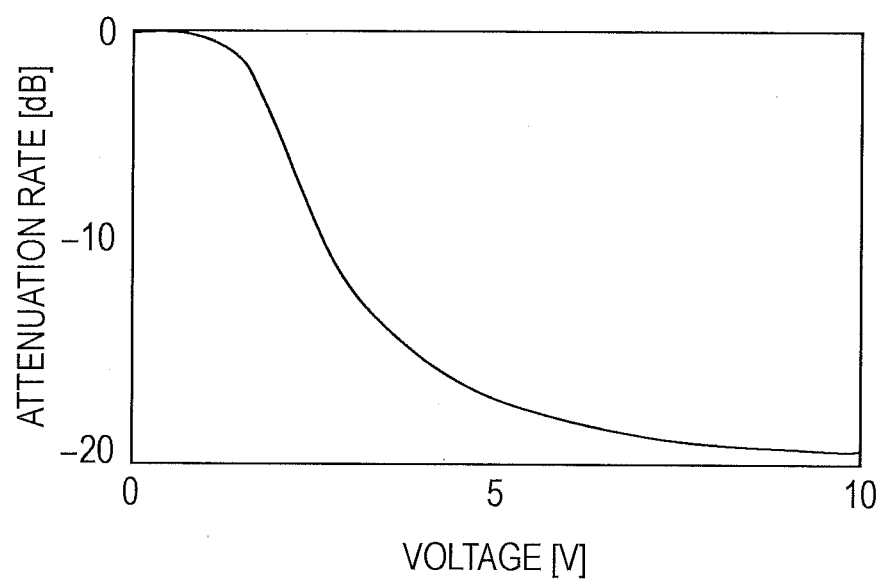
FIG. 14B illustrates a graph that indicates an attenuation characteristic of a liquid crystal element.

FIG. 14A is a diagram illustrating an outline configuration of a WSS according to a modified example of the first embodiment. In the modified example, a path controller 35 includes the MEMS array 14A and a liquid crystal array 31A, which are combined with each other and form an array 34A. The path controller 35 shifts the entire array 34A so as to control a path. The MEMS array 14A includes a plurality of MEMS mirrors 14. Similarly to the first embodiment, when the light is to be demultiplexed into light with a number m of wavelengths (channels), a number (m+6) of the MEMS mirrors 14 are arranged in the array 34A. The liquid crystal array 31A has liquid crystal elements 31 that correspond to the plurality of MEMS mirrors 14, respectively. The liquid crystal elements 31 cause incident optical signals to be attenuated at rates that correspond to voltages applied to the liquid crystal elements 31. Since the attenuation rates are controlled by liquid crystal, the MEMS mirrors 14 do not need to control the attenuation rates. Thus, the MEMS mirrors 14 may be each configured so that the MEMS mirror 14 may rotate only around the X axis in order to select a port. The attenuation rates of the liquid crystal elements 31 vary depending on the voltages applied to the liquid crystal elements 31, as illustrated in FIG. 14B.

In order to extract monitor signals that are to be input to the OCM 20, attenuation rates are controlled by liquid crystal elements 31 that correspond to three channels located on one of both sides of a number m of channels (40 channels, for example) within the service band and correspond to three channels located on the other of both sides of the number m of the channels. Specifically, the liquid crystal element 31 that corresponds to the monitor wavelength of the channel located at the center wavelength of the three channels located on the one of both sides of the number m of the channels controls the attenuation rate so that a loss is minimized; the liquid crystal element 31 that corresponds to the monitor wavelength of the channel located at the center of the three channels located on the other of both sides of the number m of the channels controls the attenuation rate so that a loss is minimized; and the liquid crystal elements 31 that correspond to the channels located on both sides of the channels corresponding to the monitor wavelengths control the attenuation rates so that losses are maximized. Thus, it is possible to accurately extract the signals with the monitor wavelengths from a part (extracted in the output port Pout and input to the OCM 20) of the optical signal, and accurately measure the centers of the monitor wavelengths. The OCM 20 monitors the monitor wavelengths, the centers of the wavelengths of the WDM signal, and power corresponding to the wavelengths of the WDM signal.

The OCM 20 calculates, as the Off-ITU amounts, deviations of the measured centers of the monitor wavelengths from the ITU grid wavelength. The converter 21 converts the Off-ITU amounts into the amount of displacement. The amount of the displacement is amplified by the amplifier 22 as a voltage to be applied. The amplified amount is input to the piezoactuator 16 of the path controller 35. The piezoactuator 16 displaces the array 34A by a desired amount in a desired direction, while the array 34A includes the liquid crystal array 31A and the MEMS array 14A.

An effect that is the same as or similar to the effect obtained in the first embodiment may be obtained in the aforementioned configuration.

Figure 15:
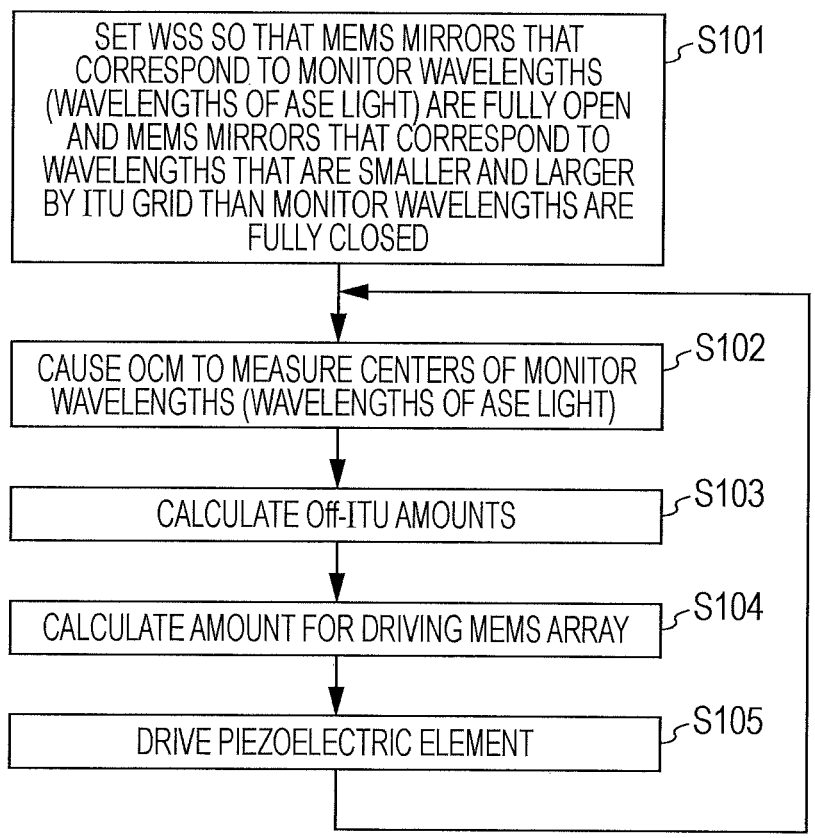
FIG. 15 illustrates a method for correcting an Off-ITU amount.

FIG. 15 illustrates a method for correcting an Off-ITU amount as a method for correcting a transmission path of light in the first embodiment. First, monitor wavelength extraction regions are set in advance using ASE spectral components that are included in an optical signal that is transferred in the WSS 10 and spread on both sides of the service band (WDM signal band). The MEMS array 14A includes MEMS mirrors corresponding to a plurality of wavelengths (channels) multiplexed into the WDM signal and MEMS mirrors corresponding to wavelengths of the monitor wavelength extraction regions. Each of the monitor wavelength extraction regions is a frequency region that covers at least three channels of a monitor wavelength and wavelengths that are smaller and larger by the ITU grid than the monitor wavelength.

In operation 101, the wavelength selective switch is set so that the MEMS mirrors that correspond to the monitor wavelengths are fully open (so as to minimize losses), and the MEMS mirrors that correspond to the wavelengths that are smaller and larger by the ITU grid than each of the monitor wavelengths are fully closed (so as to maximize losses).

Next, in operation 102, the monitor signal light is input to the OCM 20, and the OCM 20 measures the centers of the monitor wavelengths. In operation 103, the OCM 20 calculates the differences between the measured centers of the monitor wavelengths and the ITU grid wavelength as the Off-ITU amounts. In operation 104, an amount of driving of the MEMS array is calculated from the Off-ITU amounts. In operation 105, a voltage that corresponds to the calculated driving amount is applied to a driving element that is the piezoelectric element or the like so that the driving element shifts the MEMS array by a desired amount in a desired direction.

After the correction of the MEMS array 14A, the process returns to operation 102 and the OCM 20 repeatedly observes the monitor signal light and repeatedly measures Off-ITU amounts.

According to the aforementioned method and configuration, a fine adjustment mechanism such as the piezoelectric element is moved in a range of the fine adjustment mechanism, and whereby the MEMS array may cancel the Off-ITU amounts. Thus, a process of aligning the MEMS array in order to set the Off-ITU amounts to zero and a process of adjusting gas may be simplified or omitted in an alignment process for an initial adjustment.

In addition, after an assembly and an adjustment are completed and the WSS is used, the WSS may correct Off-ITU variations caused by a mechanical deformation or distortion owing to a temperature. Off-ITU variations occur owing to a change (owing to leakage or the like) in a proportion of a component in internal gas. The Off-ITU variations are corrected in the same manner. As a result, it is possible to prevent the clear path band from being reduced owing to the occurrences of the Off-ITU amounts, and transmit a signal at a high transmission rate of 40 GHz, 100 GHz or the like without a degradation of the signal.

Figure 16:
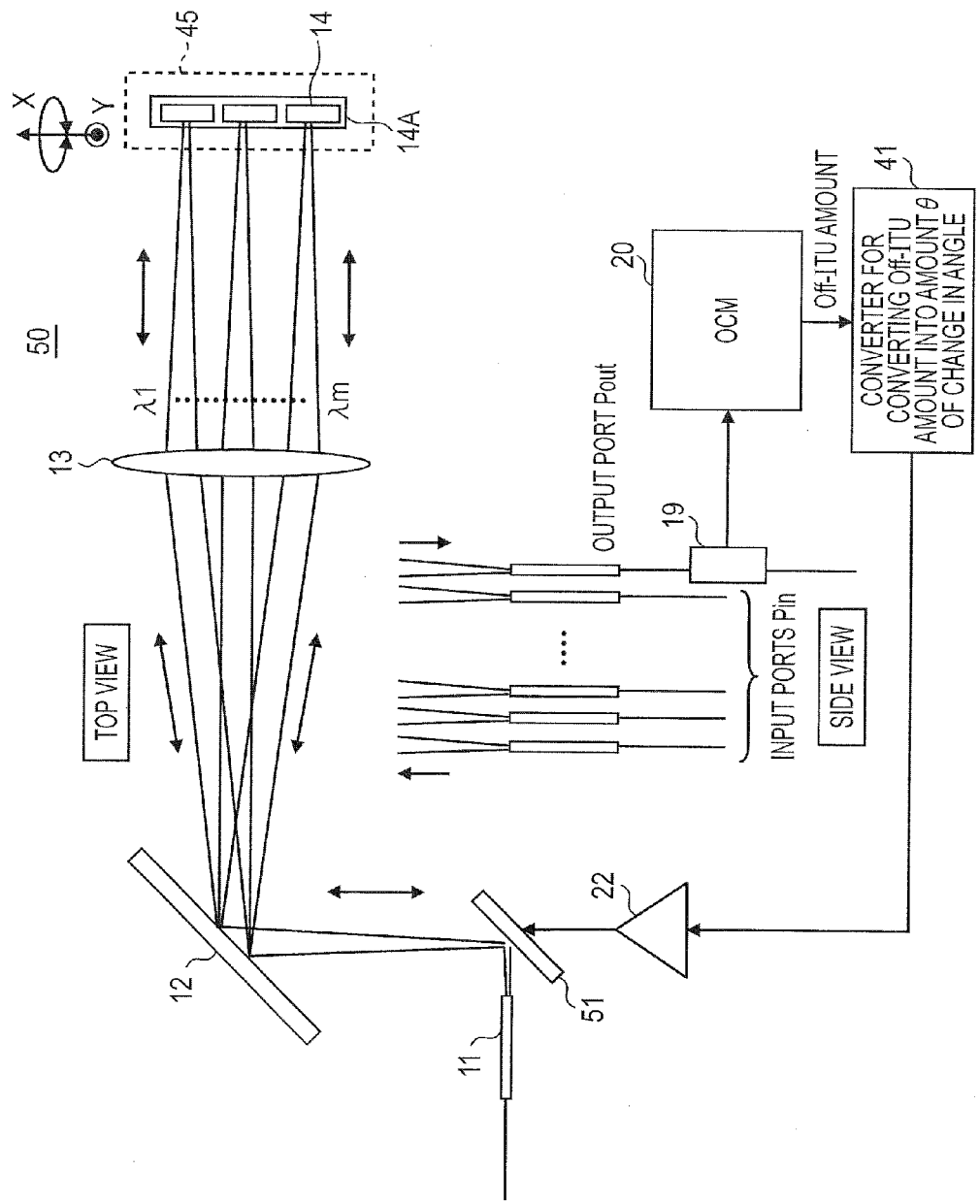
FIG. 16 illustrates an outline configuration of a wavelength selective switch according to a second embodiment.

FIG. 16 is a diagram illustrating an outline configuration of a wavelength selective switch 50 according to a second embodiment. In the second embodiment, a reflection mirror is used to shift the entire path of an optical signal to be incident on the MEMS array instead of the configuration in which the entire MEMS array is moved by the piezoactuator.

In the wavelength selective switch 50, a reflection MEMS mirror 51 is arranged in a part of an optical system. The reflection MEMS mirror 51 functionally forms a part of a path controller 45. Light is incident on the input ports Pin and output from the output ends of the optical fibers. Then, the light is collimated by the first optical system 11 and led to the wavelength demultiplexer 21 by the MEMS mirror 51. The wavelength demultiplexer 21 demultiplexes the light into light with a number m of wavelengths. The light with the number m of the wavelengths is collected by the second optical system 13 and incident on the MEMS array 14A that is included in the path controller 45. The MEMS array 14A includes the number (m+6) of the MEMS mirrors 14.

The rotational angles of the MEMS mirrors 14 around the X axis are controlled, and whereby the MEMS mirrors 14 each cause light having a desired wavelength to be coupled from a desired input port to the output port. In addition, the rotational angles of the MEMS mirrors 14 around the X axis or the Y axis may be finely controlled so that the attenuation rates are adjusted. Thus, the MEMS mirrors 14 each enable light having a desired wavelength to be coupled from a desired input port to the desired output port at a desired attenuation rate.

The following attenuation rates are controlled and minimized: the attenuation rate of the MEMS mirror 14 (for monitoring) that is located at the center of the MEMS mirrors 14 that correspond to the three channels and are located on one of both sides of the MEMS array 14A including the number m of the MEMS mirrors corresponding to the number m of wavelengths; and the attenuation rate of the MEMS mirror 14 (for monitoring) that is located at the center of the MEMS mirrors 14 that correspond to the other three channels and are located on the other of both sides of the MEMS array 14A including the number m of the MEMS mirrors corresponding to the number m of wavelengths. On the other hand, the attenuation rates of the MEMS mirrors 14 located on both sides of each of the MEMS mirrors 14 for monitoring are controlled and maximized. Similarly to the first embodiment, the WSS may be configured to measure at least one of the monitor wavelengths ch_m1 and ch_m2. However, the WSS 50 may monitor the wavelengths ch_m1 and ch_m2. In this case, the WSS 50 can calculate the average of the wavelengths ch_m1 and ch_m2 and improve the accuracy of correcting Off-ITU amounts.

The light that is returned by the path controller 45 is incident on the output port Pout through the second optical system 13, the wavelength demultiplexer 12 and the MEMS mirror 51. The optical coupler 19 extracts a part of the light in the output port Pout, and causes the part of the light to be input to the OCM 20. The OCM 20 measures the centers of the monitor wavelengths of the accurately extracted light. Then, the OCM 20 calculates Off-ITU amounts or deviations of the measured centers of the monitor wavelengths from the ITU grid wavelength (reference wavelength).

In the same manner as the first embodiment, when the ITU grid wavelength is 100 GHz and the intervals of the MEMS mirrors 14 are 250 μm, the amount D of displacement of the MEMS array 14A is expressed by Equation (3).

$$D(\mu m)=(\text{Off-ITU amount}(GHz)/100(GHz))\times 250(\mu m) \quad (3)$$

In the second embodiment, an angle of the reflection mirror 51 is controlled instead of a movement of the MEMS array 14A. Thus, a converter 41 converts information output from the OCM 20 into the amount θ of a change in an angle of the reflection MEMS mirror 51.

Specifically, a voltage to be applied to the reflection MEMS mirror 51 and the angle of the reflection MEMS mirror 51 are calibrated in advance. The amount θ of the change in the angle of the reflection MEMS mirror 51 is to be converted into the amount D of the displacement of the MEMS array 14A and is expressed by Equation (4), where F is a focal length of the lens (second optical system) 13.

$$\theta = D/F \quad (4)$$

Thus, the amount θ of the change in the angle of the reflection MEMS mirror 51 may be calculated from an Off-ITU amount output from the OCM 20. The converter 41 has a calibration curve. The amount of a change in the voltage to be applied is calculated from the calibration curve so that the amount of the change in the angle of the reflection MEMS mirror 51 is θ.

An output of the converter 41 is connected to an input of the amplifier 22. A voltage that is amplified by the amplifier 22 is applied to a rotational shaft of the MEMS mirror 51 so that an entire optical signal to be incident on the MEMS array 14A is shifted by a desired amount in a desired direction. Thus, a correction effect that is the same as the effect described with reference to FIGS. 12A and 12B or FIGS. 13A and 13B may be obtained.

In the second embodiment, the MEMS mirrors 14 are used as the switch elements, and the reflection MEMS mirror 51 is used as driving means. This configuration may be applied to the modified example illustrated in FIG. 14A. That is, the configuration in which the MEMS mirrors 14 and the liquid crystal elements 31 are combined as the switch elements.

Operations 101 to 104 of a method for correcting an Off-ITU amount according to the second embodiment are the same as operations 101 to 104 of the correction method illustrated in FIG. 15. In operation 105, the angle of the MEMS mirror 51 is controlled so that positions at which light that has wavelengths is incident on the MEMS array 14A are entirely shifted, instead of the configuration in which the piezoelectric element is driven to move the MEMS array. Thus, in operations 105, there is a common feature in which the positions at which the demultiplexed light that has the wavelengths is incident on the switch elements (MEMS mirrors 14) are relatively shifted.

Figure 17:
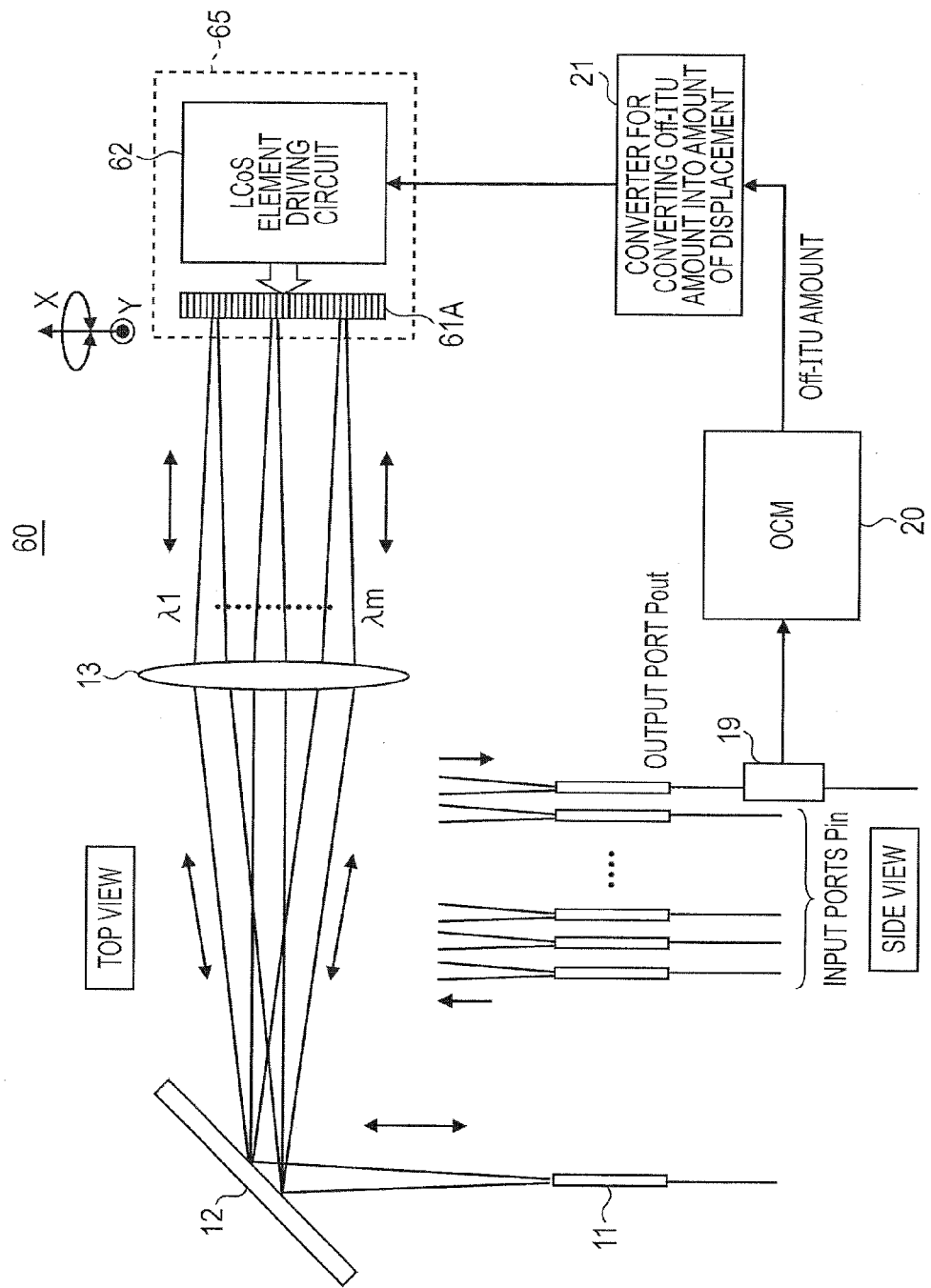
FIG. 17 illustrates an outline configuration of a wavelength selective switch according to a third embodiment.

FIG. 17 is a diagram illustrating an outline configuration of a wavelength selective switch 60 according to a third embodiment. In the third embodiment, a liquid crystal on silicon (LCoS) element array 61A is used as a switch element array included in a path controller 65, instead of the MEMS array. The LCoS element array 61A includes a plurality of liquid crystal elements arranged in a matrix form.

A voltage is applied to each of the liquid crystal elements (pixels) included in the LCoS element array 61A so that a refraction index of the liquid crystal element is freely changed. For example, when a plane wave is incident as incident light as illustrated in FIG. 18A, and a pattern of voltages to be applied to the liquid crystal elements is set so that a wavefront of light reflected from the LCoS element array 61A will have a saw-like shape, the wavefront of the light reflected from the LCoS element array 61A has the saw-like shape as illustrated in FIG. 18B. In this case, the reflected light propagates in a direction perpendicular to the wavefront. Thus, the voltages to be applied are controlled so as to set the refraction indexes of the liquid crystal elements to desired refraction indexes and control the wavefront of the reflected light. Therefore, an angle of the direction of propagation of the reflected light to be output with respect to an incident surface of the LCoS element array 61A may be changed by controlling the wavefront of the reflected light.

FIGS. 19A and 19B are outline plan views of an incidence surface of the LCoS element array 61A. As illustrated in FIG. 19A, a region in which the liquid elements (pixels) of the LCoS element array 61A exist is divided into a plurality of areas corresponding to a plurality of channels. The divided areas are used for wavelengths, respectively. Thus, the divided areas may be used as switch elements.

In this case, monitor wavelength extraction areas M1 and M2 that each correspond to at least three channels are provided on both sides of a region (for example, a region corresponding to 40 channels) corresponding to wavelengths within the service band. An area that is among the areas that correspond to the three channels and are provided on one of both sides of the region corresponding to the wavelengths within the service band is used as the monitor wavelength ch_m1, while an area that is among the areas that correspond to the three channels and are provided on the other of both sides of the region corresponding to the wavelengths within the service band is used as the monitor wavelength ch_m2. Thus, voltages to be applied to the pixel areas corresponding to the monitor wavelengths ch_m1 and ch_m2 are controlled so that attenuation is minimized. On the other hand, voltages are applied to the areas located on both sides of the areas corresponding to the monitor wavelengths ch_m1 and ch_m2 so that attenuation is maximized. In this manner, the monitor wavelengths are efficiently extracted.

The coupler 19 separates light into parts in the output port Pout, and causes a part of the light to be input to the OCM 20.

The OCM 20 measures the centers of the monitor wavelengths ch_m1 and ch_m2 and calculates, as the Off-ITU amounts, deviations of the centers of the monitor wavelengths ch_m1 and ch_m2 from the ITU grid wavelength. The converter 21 converts the Off-ITU amounts into an amount of shifting of boundaries between the areas of the LCoS element array 61A.

The path controller 65 includes the LCoS element array 61A and a driving circuit 62. The driving circuit 62 drives the LCoS elements. The driving circuit 62 entirely shifts, based on the amount (obtained by the converter 21) of the shifting, the boundaries between the pixel areas corresponding to the channels by an amount corresponding to a desired number of pixels in a desired direction.

The area boundaries are shifted in the channel direction by the amount corresponding to the number of pixels, while the number of the pixels corresponds to the Off-ITU amounts. Thus, the Off-ITU amounts are corrected so that light that has the center of each of the wavelengths is incident on the center of each of the areas. In this configuration, an effect that is the same as the first and second embodiments may be obtained without an addition of an optical part.

The method for correcting an Off-ITU amount according to the third embodiment is the same as or similar to the method illustrated in FIG. 15. The divided areas of the LCoS elements are used as the switch elements instead of the MEMS mirrors. In operation 101, the WSS 60 is set so that divided areas (switch elements) that correspond to the monitor wavelengths are fully open, and divided areas that correspond to wavelengths that are smaller and larger by the ITU grid than each of the monitor wavelengths are fully closed.

Operations 102 and 103 of the method according to the third embodiment are the same as operations 102 and 103 of the method illustrated in FIG. 15. In operation 104, an amount of shifting of the boundaries between the divided areas of the LCoS element array 61A is calculated. In operation 105, the LCoS element driving circuit 62 shifts the boundaries between the divided areas in the channel direction (wavelength direction). Thus, the correction is performed so that relative positions at which light with the wavelengths is incident on the switch elements (divided areas of the LCoS element array) match the centers of the areas. Therefore, the optimal path band may be ensured.

The first to third embodiments describe the ADD type WSSs as examples. A DROP type WSS may be applied to the first to third embodiments. In addition, a wavelength selective switch that has a single input port and a single output port may be applied to the first to third embodiments.

In addition, the invention is not limited to the first to third embodiments. Modified examples of the first to third embodiments and combinations of the first to third embodiments are included in the scope of the invention. For example, in the third embodiment, the LCoS element driving circuit 62 shifts the boundaries between the divided areas and thereby relatively shifts the positions on which the light with the wavelengths is incident. For example, the reflection mirror 51 may be used in the third embodiment in a similar manner to the second embodiment. In this case, all the positions at which the light with the wavelengths is incident on the divided areas of the LCoS element array 61A are shifted in the channel direction. Other than this configuration, arbitrary combinations of the first to third embodiments are included in the scope of the invention.

What is claimed is:
1. A wavelength selective switch comprising:
an input port and an output port;

a wavelength demultiplexer that demultiplexes wavelength-multiplexed signal light into wavelengths in different optical paths;

an optical-path controller that controls an array that has a plurality of switch elements, the plurality of switch elements switching all or a part of the wavelengths to be coupled from the input port to the output port; and an actuator driver that determines a driving amount based on a deviation of a center wavelength of a pass band from a reference wavelength and shifts the plurality of switch elements by the driving amount.

2. A wavelength selective switch comprising:

an input port and an output port;

a wavelength demultiplexer that demultiplexes wavelength-multiplexed signal light into wavelengths in different optical paths;

an optical-path controller that controls an array that has a plurality of switch elements, the plurality of switch elements switching all or a part of the wavelengths to be coupled from the input port to the output port, the optical-path controller including an actuator driver that shifts the plurality of switch elements by a driving amount determined based on a deviation of a center wavelength of a pass band of amplified spontaneously emitted light from a reference wavelength; and an optical channel monitor that monitors the wavelength-multiplexed signal light coupled to the output port, the optical channel monitor including an ASE light detector and an ASE light signal processor, the ASE light detector detecting amplified spontaneously emitted light from at least one of a side of a short wavelength of the wavelength-multiplexed signal and the side of a long wavelength of the wavelength-multiplexed signal, and an ASE light signal processor calculating the deviation of the center wavelength of a pass band of the amplified spontaneously emitted light from the reference wavelength.

3. The wavelength selective switch according to claim 2, wherein the switch elements correspond to the plurality of wavelengths, respectively, and at least other three switch elements correspond to the amplified spontaneously emitted light, and wherein an attenuation rate of a switch element that is among the other three switch elements and corresponds to the amplified spontaneously emitted light is set to a minimal rate, and attenuation rates of the switch elements that are among the other three switch elements and located on both sides of the switch element whose attenuation rate is set to the minimal rate are set to a maximal rate.

4. The wavelength selective switch according to claim 2, wherein the ASE light detector detects the amplified spontaneously emitted light from the side of the short wavelength of the wavelength-multiplexed signal and the side of the long wavelength of the wavelength-multiplexed signal, and wherein the ASE light signal processor outputs the average of a deviation of the center wavelength of a pass band of the amplified spontaneously emitted light detected from the side of the short wavelength from the reference wavelength and a deviation of the center wavelength of a pass band of the amplified spontaneously emitted light detected from the side of the long wavelength from the reference wavelength.

5. The wavelength selective switch according to claim 2, further comprising a converter configured to convert the calculated deviation into the amount of the relative shifting.

6. The wavelength selective switch according to claim 2, wherein the actuator driver is an actuator that moves the array that has the switch elements.

7. The wavelength selective switch according to claim 2, further comprising a converter configured to convert the calculated deviation into an amount of driving of the actuator.

8. The wavelength selective switch according to claim 2, wherein the actuator driver is a reflection mirror that shifts the positions at which the light with the wavelengths is incident on the array that has the switch elements.

9. The wavelength selective switch according to claim 8, further comprising a converter configured to convert the calculated deviation into the amount of a change in an angle of the reflection mirror.

10. The wavelength selective switch according to claim 2, wherein the switch elements are areas that are included in a liquid crystal on silicon ("LCoS") element array and divided so that the areas correspond to the plurality of wavelengths, respectively, and wherein the actuator driver is an LCoS element driving circuit that shifts a boundary between the divided areas of the LCoS element array.

11. The wavelength selective switch according to claim 10, further comprising a converter configured to convert the calculated deviation into the number of pixels of the LCoS element array in which the boundary between the divided areas are shifted in a channel direction.

12. The wavelength selective switch according to claim 2, wherein the switch elements are areas that are included in an LCoS element array and divided so that the areas correspond to the plurality of wavelengths, respectively, and wherein the actuator driver is a reflection mirror that shifts positions at which the light with the wavelengths is incident on the divided areas of the LCoS element array.

13. The wavelength selective switch according to claim 12, further comprising a converter configured to convert the calculated deviation into the amount of a change in an angle of the reflection mirror.

14. The wavelength selective switch according to claim 2, wherein the switch elements are MEMS mirrors.

15. The wavelength selective switch according to claim 2, wherein the switch elements are combinations of MEMS mirrors and liquid crystal elements.

16. The wavelength selective switch according to claim 2, wherein the ASE light detector includes a diffraction grating and a light detecting element array, and uses light detecting elements included in the light detecting element array to detect the amplified spontaneously emitted light dispersed by the diffraction grating.

17. The wavelength selective switch according to claim 2, wherein the ASE light detector includes a tunable filter and a single light detector, and uses the light detector to detect a component of the amplified spontaneously emitted light swept by the tunable filter.

18. A wavelength selective switch that is used for a wavelength multiplexing communication system, comprising:

switch elements that correspond to a plurality of wavelengths multiplexed into an optical signal, respectively; and at least other three switch elements that correspond to amplified spontaneously emitted light that has different wavelengths from the plurality of wavelengths, wherein an attenuation rate of a switch element that is among the other three switch elements and corresponds to the amplified spontaneously emitted light is set to a minimal rate, and attenuation rates of the switch elements that are among the other three switch elements and located on both sides of the switch element whose attenuation rate is set to the minimal rate are set to a maximal rate, wherein light monitor configured to measure the center wavelength of a pass band of the amplified spontaneously emitted light, wherein a deviation of the center wavelength of pass band of the amplified spontaneously emitted light from a reference wavelength is calculated, and wherein positions at which light with the wavelengths is incident on the switch elements corresponding to the plurality of wavelengths are relatively shifted by a driving amount determined based on the deviation of the center wavelength of the pass band so that the deviation is offset.

19. The wavelength selective switch according to claim 18, wherein a part of the amplified spontaneously emitted light is extracted from at least one of the side of a short wavelength of the wavelength-multiplexed signal and the side of a long wavelength of the wavelength-multiplexed signal.

20. The wavelength selective switch according to claim 18, wherein parts of the amplified spontaneously emitted light are extracted from both the side of a short wavelength of the wavelength-multiplexed signal and the side of a long wavelength of the wavelength-multiplexed signal, and wherein in the calculating the deviation, the average of a deviation of the center wavelength of pass band of the amplified spontaneously emitted light extracted from the side of the short wavelength of the wavelength-multiplexed signal from the reference wavelength and a deviation of the center wavelength of a pass band of the amplified spontaneously emitted light extracted from the side of the long wavelength of the wavelength-multiplexed signal from the reference wavelength is calculated.

* * * * *